(12) United States Patent
Coppock

(10) Patent No.: US 12,031,527 B1
(45) Date of Patent: Jul. 9, 2024

(54) MECHANICAL SYSTEM TO AMPLIFY WORK OUTPUT TO BE GREATER THAN WORK INPUT

(71) Applicant: BOLD EARTH SCIENTIFIC LLC, LaGrange, CA (US)

(72) Inventor: Andy Coppock, LaGrange, CA (US)

(73) Assignee: Bold Earth Scientific, LLC

( * ) Notice: Subject to any disclaimer, the term of this patent is extended or adjusted under 35 U.S.C. 154(b) by 0 days.

(21) Appl. No.: 18/402,335

(22) Filed: Jan. 2, 2024

Related U.S. Application Data

(60) Provisional application No. 63/439,669, filed on Jan. 18, 2023.

(51) Int. Cl.
*F03G 3/08* (2006.01)
*F03G 7/10* (2006.01)

(52) U.S. Cl.
CPC ............. *F03G 3/08* (2013.01); *F03G 7/115* (2021.08)

(58) Field of Classification Search
CPC .. F03G 3/08; F03G 7/115; H02K 1/27; H02K 7/003; H02K 7/02; H02K 7/116; H02K 7/1823; H02K 53/00
See application file for complete search history.

(56) References Cited

U.S. PATENT DOCUMENTS

| | | | | |
|---|---|---|---|---|
| 5,594,289 A | * | 1/1997 | Minato | H02K 25/00 310/156.01 |
| 6,084,322 A | * | 7/2000 | Rounds | H02K 53/00 310/46 |
| 11,018,569 B1 | * | 5/2021 | Herrin | H02K 49/102 |
| 2007/0145845 A1 | * | 6/2007 | Tkadlec | H02K 53/00 310/152 |
| 2011/0156513 A1 | * | 6/2011 | Froelich | H02K 53/00 310/74 |
| 2014/0318518 A1 | * | 10/2014 | Jeswine | F02B 75/02 123/73 R |
| 2014/0333166 A1 | * | 11/2014 | Gardner | H02K 49/104 310/103 |
| 2020/0403465 A1 | * | 12/2020 | Cummings | H02K 1/27 |

FOREIGN PATENT DOCUMENTS

| | | | | |
|---|---|---|---|---|
| CN | 111371285 A | * | 7/2020 | ........... H02N 11/002 |
| WO | WO-2008040822 A1 | * | 4/2008 | ............. F03B 13/16 |
| WO | WO-2021094629 A1 | * | 5/2021 | ............ F03B 17/062 |

OTHER PUBLICATIONS

Translation of WO-2008040822-A1, Ruiz et al., Apr. 10, 2008 (Year: 2008).*
Translation of CN-111371285-A, Su et al., Jul. 3, 2020 (Year: 2020).*
Translation of WO-2021094629-A1, Arcusin, May 20, 2021 (Year: 2021).*

* cited by examiner

*Primary Examiner* — Vinh Luong
(74) *Attorney, Agent, or Firm* — Stanzione & Associates, PLLC; Patrick Stanzione

(57) ABSTRACT

A mechanical energy amplification system having a frame that supports a cylindrical rotary reactor magnet assembly, an oscillating reactor magnet assembly, and an input impulse magnet assembly, which rotates a shaft of both the rotary reactor magnet assembly and the oscillating reactor magnet assembly when pivoted back and forth, and generating a greater output energy than an energy input at the input impulse magnet assembly by pivoting an output pivot shaft by the rotation of the shafts of the rotary reactor magnet assembly and the oscillating reactor magnet assembly.

12 Claims, 14 Drawing Sheets

FIG. 1A
CONVENTIONAL
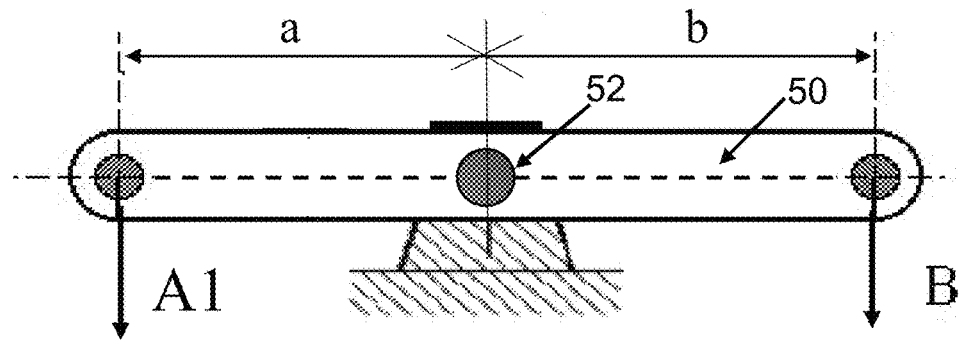
$$A1 \cdot a = B \cdot b$$
FIG. 1B
CONVENTIONAL
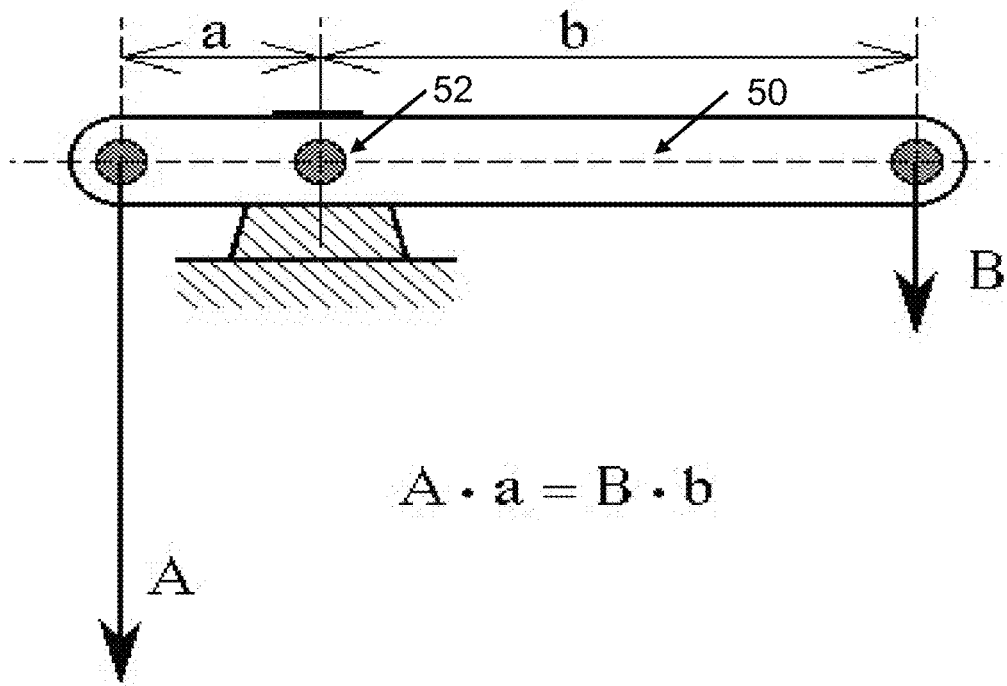
$$A \cdot a = B \cdot b$$

Phase 1
0 deg Flywheel Position
Input Impulse Neutral

Phase 2
90 deg Flywheel Position / LH Rotation
Input Impulse Left

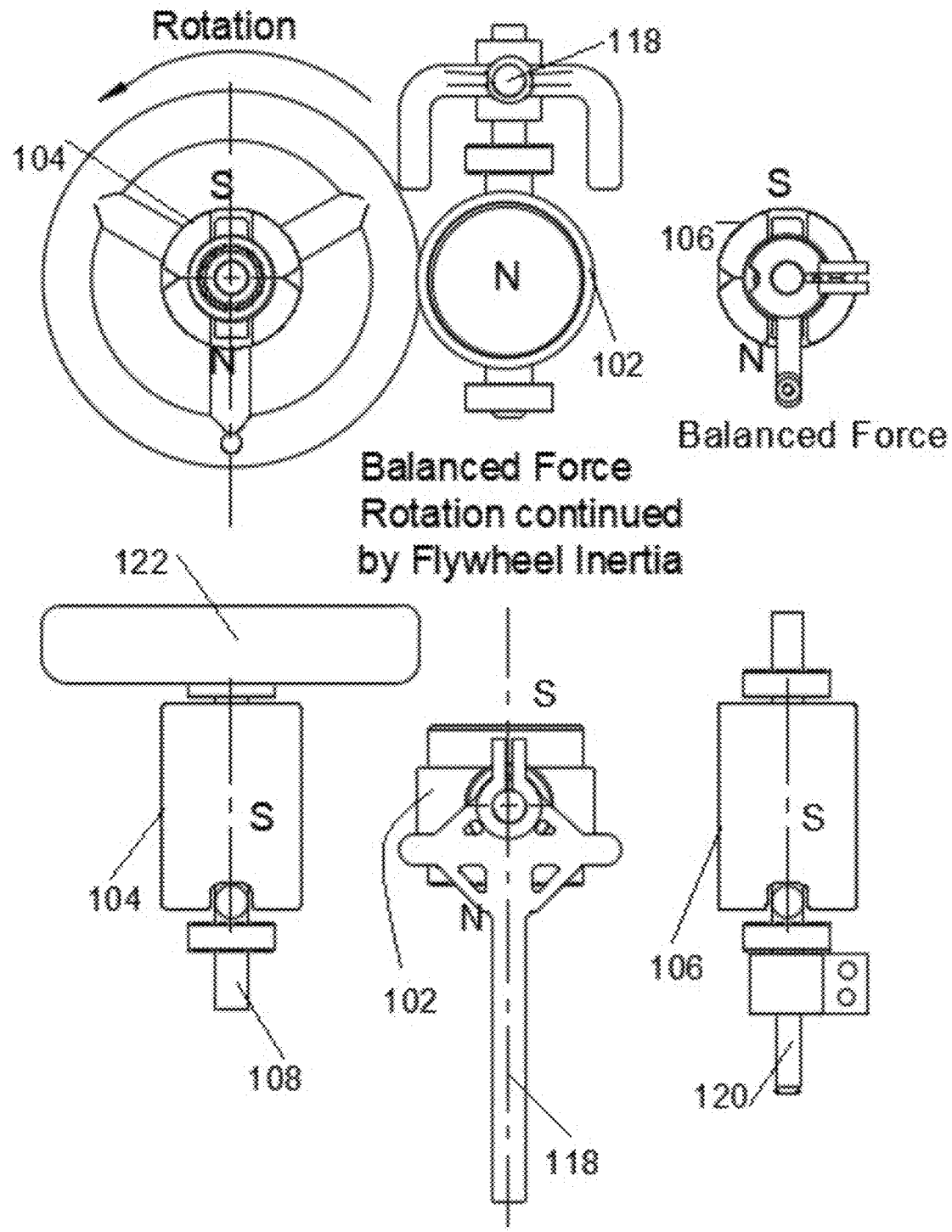

Phase 4
270 deg Flywheel Position / LH Rotation
Input Impulse Right

MECHANICAL SYSTEM TO AMPLIFY WORK OUTPUT TO BE GREATER THAN WORK INPUT

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

Field of the Invention

The present inventive concept relates to a mechanical system to amplify work output to be extensively greater than work input. More particularly, but not exclusively, this inventive concept relates to a mechanical system that, through a timed and coordinated angular coupling and decoupling of permanent magnetic fields produces an output expression of work that is extensively greater than an input work required to operate such that work is produced silently without wasting any heat, emissions or consumable fuel.

Description of the Related Art

In typical mechanical advantage devices (a simple machine that exhibits mechanical advantages), force/energy is converted from one means to another based on leverage. FIGS. 1A and 1B illustrate such a mechanical advantage device 10. This conversion of energy is expressed as force applied over a given distance. A simple lever 50 with a fulcrum 52 centered will be in stasis (aka: equilibrium) with equal loads at equal distances. To lift a one-pound weight A1 using a lever 50 with a fulcrum 52 centered (FIG. 1A), you must apply slightly over one pound of force B to the opposite end of the lever in order to create movement or "work." Referring to FIG. 1B, to lift a greater amount of weight A2 (e.g., a heavier load) you must move the fulcrum 52 closer to the load A2. This increases the amount of weight you can lift but decreases the distance the weight will travel while increasing the distance b of force applied to the lever 50. In this manner we can lift our car with a jack, use block and tackle pulleys to lift heavy loads and perform work that is otherwise beyond our physical capability. When you analyze these systems, however, it is apparent that the total energy delivered (input energy) is always equal to the total energy expended (output energy), minus friction, thermodynamic losses, and outside influences.

U.S. Pat. No. 6,084,322 by Rounds discloses a magnetically operated device using a driving magnet and a driven magnet which together amplifies mechanical energy with a magnetomotive force. This system requires both a DC electric motor 24 and a drive 18, which is either an endless chain or a timing belt 19, entraining a small sprocket or pulley 20 and a large sprocket or pulley 21 in which the timing belt 19 is driven. Although this patent is titled "Amplifying Mechanical Energy With Magnetomotive Force," there is in fact no conservation of energy, while instead resulting in a loss of energy. Further, an electromagnet is relied on for developing a differential force to generate motion. Further, the amplification of electromagnetic force is minimal.

U.S. Pat. No. 5,594,289 by Minato discloses a magnetic rotating apparatus. As illustrated in FIG. 3, this apparatus includes first and second magnet rotors 6 and 8 each having disposed on their disk-shaped surfaces a plurality of tabular magnets 22A through 22H for developing a magnetic field for generating the turning forces and balancers 20A through 20H. FIG. 4 illustrates that windings of electromagnets 12 and 14 are connected to a DC power source 42 which produces a torque 32 (FIG. 5) to turn the magnetic rotors 6 and 8. In other words, this magnetic rotating apparatus relies on electromagnetic force (electrical energy) to turn rotors 6 and 8 while no significant amplification of energy is taught or disclosed.

Accordingly, there is a need for a motor system that delivers sustained rotational energy without the need for conventional electromagnetic-based or field dense configurations.

There is also a need for a system that provides a combination of magnetic and rotational forces which can ensure efficient and differential force generation without stasis or field density diminishment.

There is also a need for a system that can significantly reduce reliance on fossil fuels, thus significantly lowering or potentially eliminating carbon emissions.

SUMMARY OF THE INVENTIVE CONCEPT

The present general inventive concept provides a mechanical system that, through a timed and coordinated angular coupling and decoupling of permanent magnetic fields, produces an output expression of work that is significantly greater than an input work required to operate, such that work is produced silently without wasting any heat, emissions or consumable fuel.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a mechanical energy amplification system, comprising: a framework including: a front portion having an output pivot shaft trunnion rotatably disposed thereon, the output pivot shaft trunnion including an output pivot shaft extending therethrough and having a first end and a second end, a middle portion having a cylindrical rotary reactor magnet assembly rotatably disposed thereon, the cylindrical rotary reactor magnet assembly including a main motor shaft extending through an axial center portion thereof to rotate together with the cylindrical rotary reactor magnet assembly, a rear portion having a cylindrical oscillating reactor magnet assembly rotatably disposed thereon, the cylindrical oscillating reactor magnet assembly including an oscillating reactor magnet shaft extending through an axial center portion thereof to rotate with the cylindrical oscillating reactor magnet assembly and an oscillating reactor magnet crank having a first end connected to a first end of the oscillating reactor magnet shaft; and an input impulse magnet assembly pivotal about a vertical input impulse magnet assembly shaft extending therethrough and disposed between the cylindrical rotary reactor magnet assembly and the oscillating reactor magnet assembly and including a magnetic north pole disposed at a first end, a magnetic south pole disposed at a second opposite end and an input lever extending therefrom to pivot the input impulse magnet assembly back and forth to pivot the magnetic north pole and the magnetic south pole towards and away from the cylindrical rotary reactor magnet assembly and the cylindrical oscillating reactor magnet assembly; a flywheel disposed adjacent to a first end of the cylindrical rotary reactor magnet assembly and receiving a first end of the main motor shaft through a center thereof to rotate therewith; a flywheel crank having a first end attached to the first end of the main motor shaft to rotate therewith together with the flywheel and including a flywheel crank bearing rotatably connected to a second end of the flywheel crank; an oscillating reactor magnet power rod rotatably connected at a first end thereof to a second end of the oscillating reactor magnet crank and configured to shift back and forth when the oscillating reactor magnet crank rotates and at a second end thereof rotatably connected to a first end of the output pivot shaft to pivot the output pivot shaft and the output pivot shaft trunnion when the oscillating reactor magnet crank rotates; and a flywheel crank drive link having a first end connected to the flywheel crank bearing and a second end rotatably connected to the second end of the output pivot shaft and configured to shift back and forth when the flywheel crank bearing rotates about the second end of the flywheel crank to pivot the output pivot shaft and the output pivot trunnion.

In an exemplary embodiment, the cylindrical rotary reactor magnet assembly can include an elongated magnetic north pole extending along a length thereof and an elongated magnetic south pole extending along the length thereof and disposed at 180 degrees from the elongated magnetic north pole, and the cylindrical oscillating reactor magnet assembly includes an elongated magnetic north pole extending along a length thereof and an elongated magnetic south pole extending along the length thereof and disposed at 180 degrees from the elongated magnetic north pole.

In another exemplary embodiment, the front portion can include a pair of output pivot trunnion bearings axially aligned vertically to rotatably secure the output pivot shaft trunnion in place, the middle portion includes a pair of main rotor drive shaft bearings axially aligned horizontally to rotatably secure the cylindrical rotary reactor magnet assembly in place, the rear portion includes a pair of oscillating reactor magnet assembly bearings axially aligned horizontally to rotatably secure the oscillating reactor magnet assembly in place, and a pair of input impulse magnet assembly bearings axially aligned vertically to rotatably secure the input impulse magnet assembly in place by being fixed to first and second ends of the vertical input impulse magnet assembly shaft.

In still another exemplary embodiment, the cylindrical rotary reactor magnet assembly can include a shaft extending vertically therethrough and rotatably fixed to the pair of input impulse magnet assembly bearings, the shaft including an input lever bracket connected to one end thereof in which the input lever in connected to and extends therefrom.

In still another exemplary embodiment, the framework can include: a pair of elongated feet extending in parallel; a front pedestal connected between the pair of elongated feet having a middle portion connected to a lower one of the pair of output pivot trunnion bearings; a first front arm connected between a first one of the pair of main rotor drive shaft bearings and an upper one of the pair of outer pivot trunnion bearings; a second front arm connected between a second one of the pair of main rotor drive shaft bearings and the upper one of the pair of outer pivot trunnion bearings; a first v-shaped member having a first leg extending from a first one of the pair of elongated feet and connected to the first one of the pair of main rotor drive shaft bearings and a second leg extending from the first one of the pair of elongated feet and connected to a first one of the pair of oscillating reactor magnet assembly bearings; and a second v-shaped member having a first leg extending from a second one of the pair of elongated feet and connected to the second one of the pair of main rotor drive shaft bearings and a second leg extending from the second one of the pair of elongated feet and connected to a second one of the pair of oscillating reactor magnet assembly bearings.

In yet another exemplary embodiment, the framework can further include: a first rear arm extending between the first oscillating reactor magnet assembly bearing and the first main rotor drive shaft bearing; a second rear arm extending between the second oscillating reactor magnet assembly bearing and the second main rotor drive shaft bearing; a rear upper pedestal connected between the first and second rear arms to fixedly support an upper one of the pair of input impulse magnet assembly bearings; and a rear lower pedestal connected between the pair of elongated feet to fixedly support a lower one of the pair of input impulse magnet assembly bearings.

In still another exemplary embodiment, output energy/force is supplied by movement of the first end of the output pivot shaft.

In still another exemplary embodiment, the framework can be a unitary body including the pair of elongated feet, the front pedestal, the first and second front arms, the pair of output pivot trunnion bearings, the pair of main rotor drive shaft bearings, the first and second v-shaped members, the rear upper and lower pedestals and the pair of input impulse magnet assembly bearings.

The foregoing and/or other features and utilities of the present general inventive concept may also be achieved by providing a mechanical energy amplification system, comprising: a pair of elongated feet extending in parallel; a front pedestal connected between a front end of the pair of elongated feet and having a first output pivot shaft trunnion bearings connected thereto; a first v-shaped member extending from a middle portion of a first one of the pair of elongated feet and having a first rotary reactor magnet assembly bearing connected to an end of a first leg thereof and a first oscillating reactor magnet assembly bearing connected to an end of a second leg thereof; a second v-shaped member extending from a middle portion of a second one of the pair of elongated feet and having a second rotary reactor magnet assembly bearing connected to an end of a first leg thereof and axially aligned with the first rotary reactor magnet assembly bearing and a second oscillating reactor magnet assembly bearing connected to an end of a second leg thereof and being axially aligned with the first oscillating reactor magnet assembly bearing; a second output pivot shaft trunnion bearing disposed directly above and axially aligned with the first output pivot shaft trunnion bearing and fixed to both the first and second rotary reactor magnet assembly bearings; an output pivot shaft trunnion pivotally connected between the first and second output pivot shaft trunnion bearings and having a first output pivot shaft extending horizontally from one side thereof and a second output pivot shaft extending horizontally from an opposite side thereof such that the first and second output pivot shafts are axially aligned; a cylindrical rotary reactor magnet assembly rotatably connected between the first and second rotary reactor magnet assembly bearings via a rotary reactor magnet assembly shaft extending through an axial center portion thereof, the rotary reactor magnet assembly shaft having a first end rotatably connected to the first rotary reactor magnet assembly bearing and a second end extending through the second rotary reactor magnet assembly bearing and having a flywheel and a first end of a flywheel crank connected thereto, the flywheel crank having a flywheel crank bearing rotatably connected to a second end thereof; a cylindrical oscillating reactor magnet assembly connected between the first and second oscillating reactor magnet assembly bearings via an oscillating reactor magnet shaft extending through an axial center portion thereof, the oscillating reactor magnet shaft having an oscillating reactor magnet crank extending from one end thereof and a flywheel adjacent to the oscillating reactor magnet crank which both rotate with the oscillating reactor magnet shaft; an oscillating reactor magnet power rod rotatably connected at a first end thereof to the oscillating reactor magnet crank and pivotally connected at a second end to the first output pivot shaft and configured to pivot the first output pivot shaft when the oscillating reactor magnet assembly and corresponding oscillating reactor magnet shaft rotate; a flywheel crank drive shaft connected at a first end thereof to the flywheel crank bearing and a second end thereof connected to the second output pivot shaft and configured to pivot the second output pivot shaft when the cylindrical rotary reactor magnet assembly, the rotary reactor magnet assembly shaft and the flywheel crank are rotated; and an input impulse reactor magnet pivotally disposed between the cylindrical rotary reactor magnet assembly and the cylindrical oscillating reactor magnet assembly configured to rotate both the cylindrical rotary reactor magnet assembly and the cylindrical oscillating reactor magnet assembly when pivoted back and forth about an input impulse reactor magnet shaft.

In an exemplary embodiment, the mechanical energy amplification system can further comprise an input lever connected to the input impulse reactor magnet shaft to receive an input pivotal energy to pivot the input impulse reactor magnet.

In another exemplary embodiment, the first output pivot shaft produces an amplified output energy when at least one of the cylindrical rotary reactor magnet assembly and the cylindrical oscillating reactor magnet assembly are rotated by pivotal movement of the input lever.

In still another exemplary embodiment, the second output pivot shaft trunnion bearing can be fixed to the first rotary reactor magnet assembly bearing by a first front arm and fixed to the second rotary reactor magnet assembly bearing by a second front arm.

The foregoing and/or other features and utilities of the present general inventive concept may also be achieved by providing a method of amplifying input energy to produce greater output energy, the method comprising: rotating a shaft of a cylindrical rotary reactor magnet assembly and a shaft of an oscillating reactor magnet assembly simultaneously by pivoting back and forth an input impulse magnet assembly disposed between the cylindrical rotary reactor magnet assembly and the oscillating reactor magnet assembly; rotating a flywheel together with the rotation of the shaft of the cylindrical rotary reactor magnet assembly; pivoting a flywheel crank drive link back and forth when the shaft of the cylindrical rotary reactor magnet assembly and flywheel are rotated; pivoting an oscillating reactor magnet power rod back and forth when the shaft of an oscillating reactor magnet assembly is rotated; and pivoting an output main motor shaft back and forth when the flywheel crank drive link and the oscillating reactor magnet power rod are pivoted back and forth.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1A illustrates a conventional mechanical advantage device including a simple lever 50 with a fulcrum 52 centered at equilibrium with equal loads at equal distances.

FIG. 1B illustrates the conventional mechanical advantage device of FIG. 1A with the fulcrum 52 being shifted toward the load.

FIG. 9C illustrates a third phase of operational movement of the mechanical system in accordance with the example embodiment of FIGS. 2A-2B.

Figure 2A:
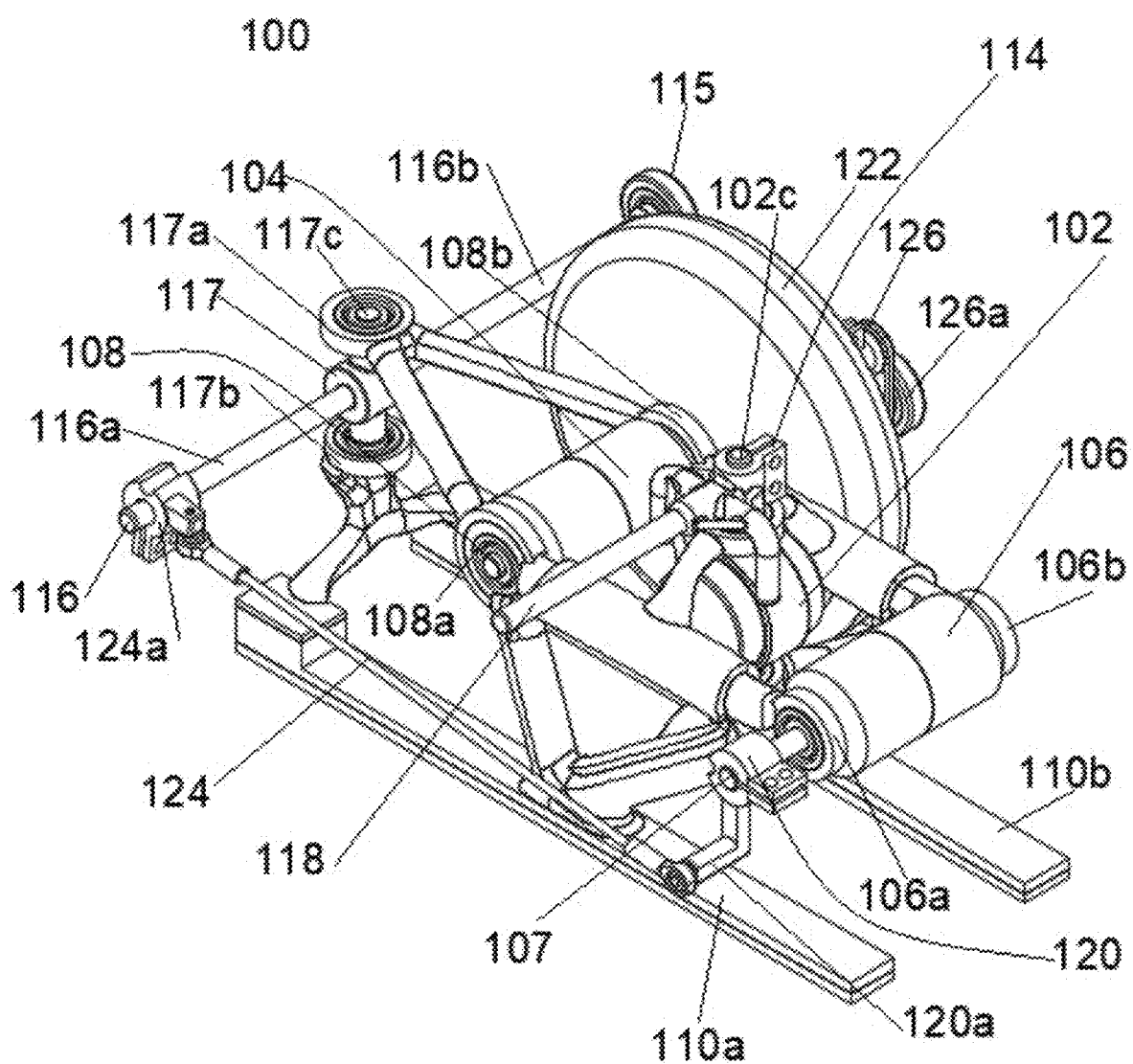
FIG. 2A illustrates a left side plan view of a mechanical system, in accordance with an example embodiment of the present inventive concept.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the present inventive concept. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Example embodiments of the present general inventive concept are directed to a mechanical system to amplify work output to be significantly greater than work input. More particularly, but not exclusively, the present inventive concept relates to a mechanical system that, through a timed and coordinated angular coupling and decoupling of permanent magnetic fields, produces an output expression of work that is significantly greater than an input work required to operate, such that work is produced silently without any waste of heat, emissions or consumable fuel.

Figure 2B:
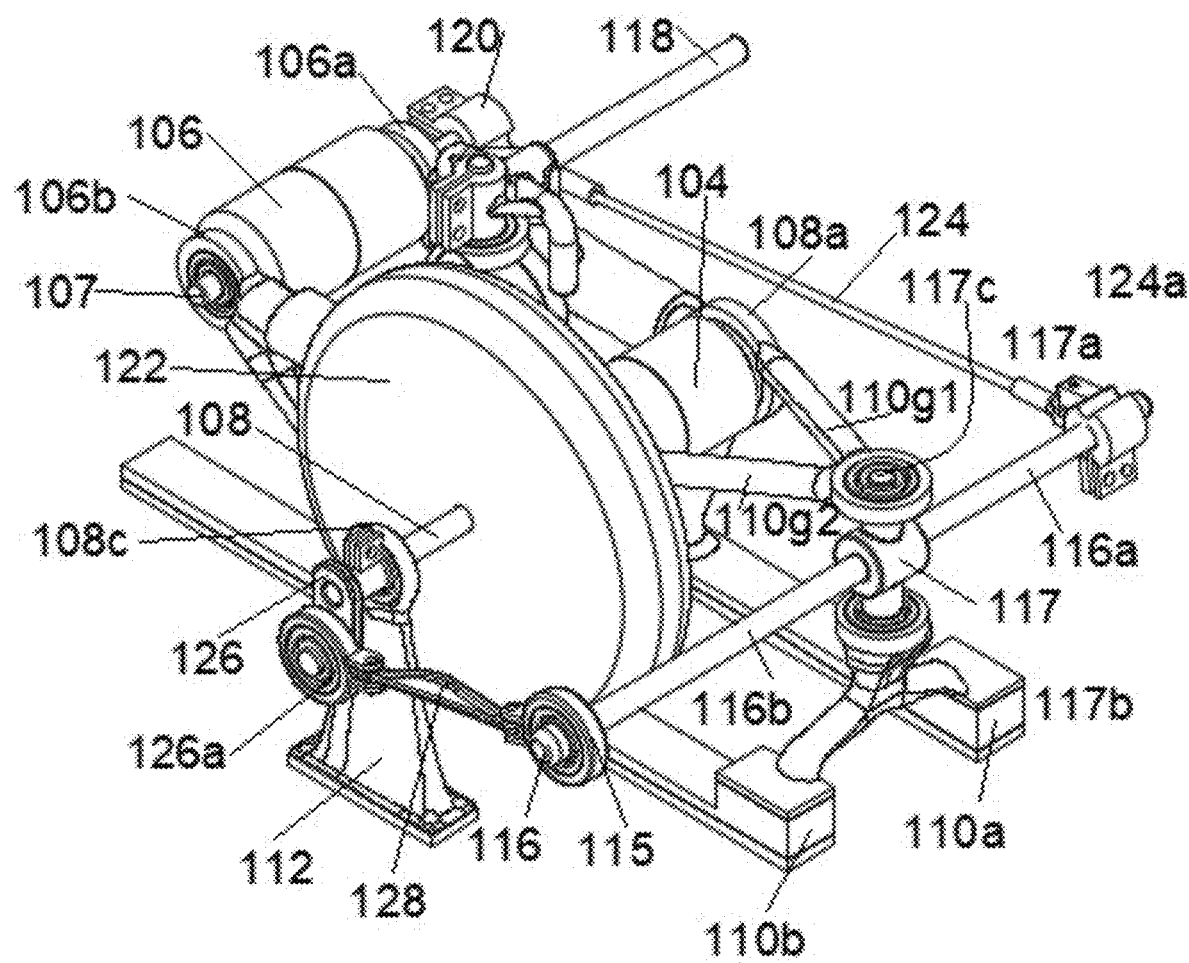
FIG. 2B illustrates a right side plan view of the mechanical system, in accordance with the example embodiment of FIG. 2A.

FIGS. 2A and 2B illustrate a mechanical system 100 that amplifies work output to be significantly greater than the work input, according to an example embodiment of the present inventive concept. This mechanical system 100 amplifies energy input without expending heat, emissions or consumable fuel. This mechanical system 100 also utilizes a unique mechanism, precise timing, and a redistribution of counteractive forces into a motor's framework to ensure continuous, efficient, and differential force generation without encountering stasis or field density diminishment. This mechanical system 100 operates optimally, delivering sustained rotational energy without relying on conventional electromagnet-based or field-dense configurations, thus offering a groundbreaking solution in the motor technology landscape.

Referring to FIGS. 2A and 2B, the mechanical system 100 can include an input impulse magnet assembly 102, a rotary reactor magnet assembly 104 and an oscillating reactor magnet assembly 106, which when operating together, provide a significantly greater output force than an applied input force. More specifically, the input impulse magnet assembly 102, the rotary reactor magnet assembly 104 and the oscillating reactor magnet assembly 106 can be rotationally fixed to a unitary framework 110 such that the input impulse magnet assembly 102 is disposed between the rotary reactor magnet assembly 104 and the oscillating reactor magnet assembly 106. Additional features of the mechanical system 100 according to this example embodiment will be described in more detail below.

Figure 3A:
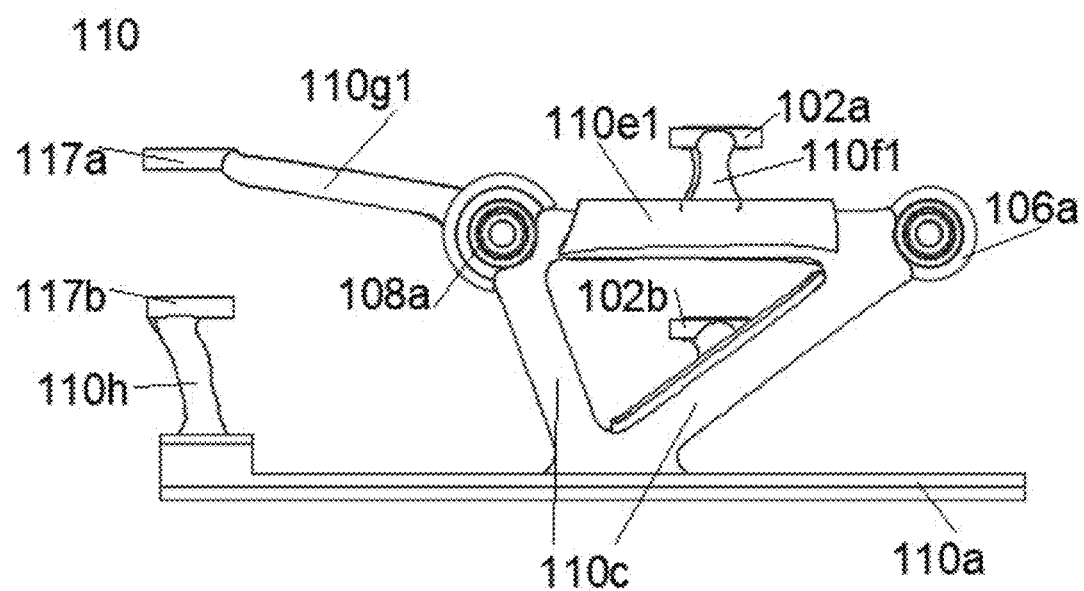
FIG. 3A illustrates a left side view of a frame structure of the mechanical system in accordance with the example embodiment of FIGS. 2A-2B.
Figure 3B:
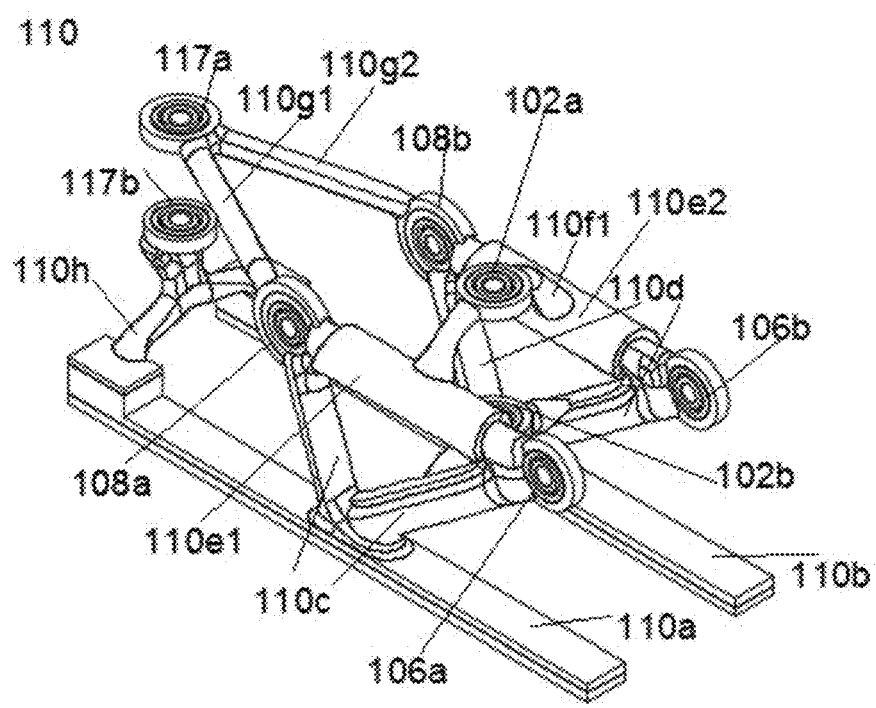
FIG. 3B illustrates a left side plan view of a frame structure of the mechanical system in accordance with the example embodiment of FIGS. 2A-2B.
Figure 3C:
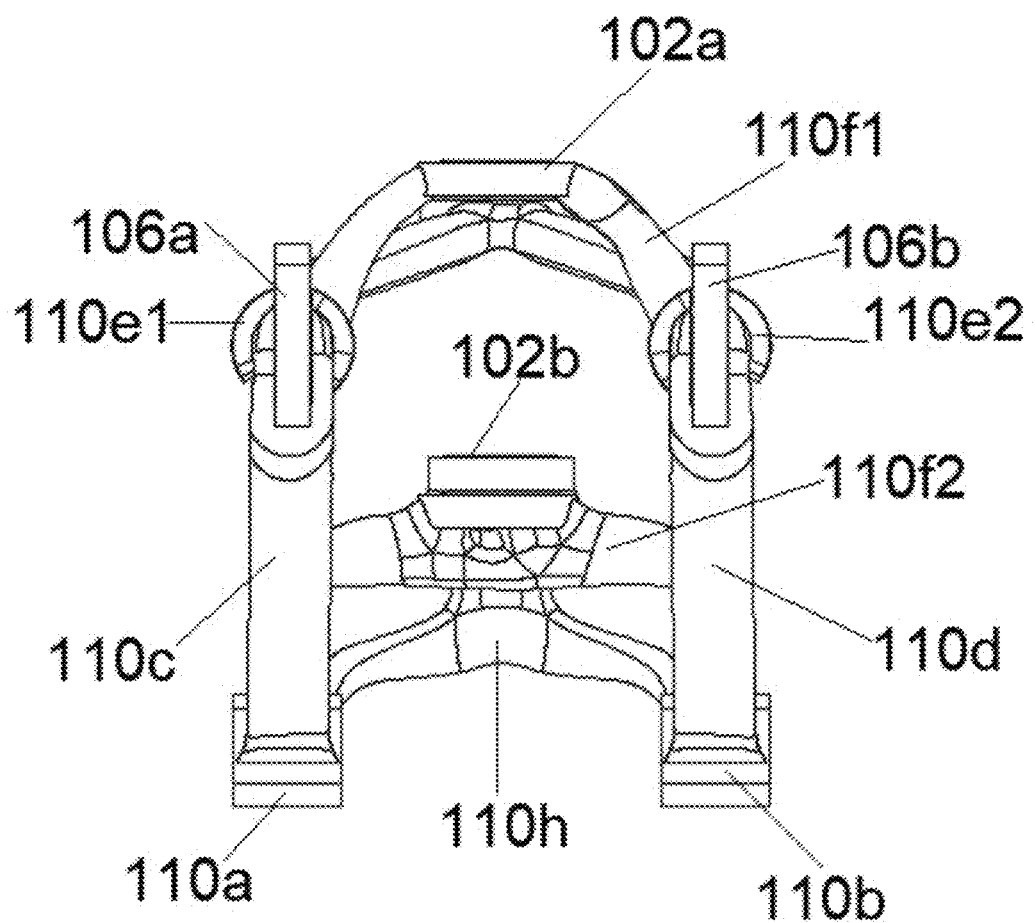
FIG. 3C illustrates a rear view of a frame structure of the mechanical system in accordance with the example embodiment of FIGS. 2A-2B.

FIGS. 3A-3C illustrate details of the framework 110. Referring to FIGS. 3A-3C, the framework 110 can include a pair of elongated feet 110a and 110b disposed in parallel with each other. The foot 110a can include a first v-shaped member 110c extending upward and away from the foot 110a, and the foot 110b can include a second v-shaped member 110d extending upward and away from the foot 110b, such that the first and second v-shaped members 110c and 110d are disposed in parallel. It is to be noted that the framework 110 can be provided in alternative equivalent configurations than parallel elongated feet and v-shaped members which will provide the intended purposes as described herein without departing from the spirit and scope of the over inventive concept. However, in order to provide brevity to the detailed description the framework 110 will be described as illustrated in FIGS. 3A-3B. In accordance with an example embodiment, the framework 110 can include the pair of elongated feet 110a and 110b and the first and second v-shaped members 110c and 110d as one unitary body.

One end of the first v-shaped member 110c can include a first oscillating reactor magnet assembly bearing 106a fixed thereto and a second end of the first v-shaped member 110c can include a first main rotor drive shaft bearing 108a fixed thereto. One end of the second v-shaped member 110d can include a second oscillating reactor magnet assembly bearing 106b fixed thereto and a second end of the second v-shaped member 110d can include a second main rotor drive shaft bearing 108b fixed thereto. Preferably, the first oscillating reactor magnet assembly bearing 106a and the second oscillating reactor magnet assembly bearing 106b can each include a centrally located hole extending therethrough which are axially aligned, and the first main rotor drive shaft bearing 108a and the second main rotor drive shaft bearing 108b can each include a centrally located hole extending therethrough which are axially aligned. It is to be noted that alternative equivalent configurations can be used in place of the oscillating reactor magnet assembly bearings 106a-106b and the main rotor drive shaft bearings 108a-108b which will perform the intended purposes as described herein, such as, for example a single oscillating reactor magnet assembly bearing and a single main rotor drive shaft bearing.

Extending between the first oscillating reactor magnet assembly bearing 106a and the first main rotor drive shaft bearing 108a can be a first rear arm 110e1 and extending between the second oscillating reactor magnet assembly bearing 106b and the second main rotor drive shaft bearing 108b can be a second rear arm 110e2. The first rear arm 110e1 and the second rear arm 110e2 are preferably disposed horizontally and in parallel with each other. It is to be noted that the first and second rear arms 110e1 and 110e2 can alternatively be disposed at different angles other than horizontal, depending on the positioning of input impulse magnet assembly 102, the rotary reactor magnet assembly 104 and the oscillating reactor magnet assembly 106 with respect to each other, such that the angle positioning of the first rear arm 110e1 and the second rear arm 110e2 provides the intended purposes of the mechanical system 100 as described herein.

Connected between the first rear arm 110e1 and the second rear arm 110e2 can be disposed a rear upper pedestal 110f1. The rear upper pedestal 110f1 can be configured to fixedly support an upper input impulse magnet assembly bearing 102a. Directly below the rear upper pedestal 110f1 and connected between the first v-shaped member 110c and the second v-shaped member 110d can be disposed a rear lower pedestal 110f2 (see FIG. 3C). The rear lower pedestal 110f2 can be configured to fixedly support a lower input impulse magnet assembly bearing 102b. The upper input impulse magnet assembly bearing 102a and the lower input impulse magnet assembly bearing 102b preferably each include a central hole extending therethrough which are in axial alignment with each other to fixedly receive respective ends of a first extension member 117c and a second extension member 117d of a cylindrical output pivot shaft trunnion 117 to be described in more detail below with respect to FIGS. 2A-2B and FIGS. 4-6.

Referring to FIGS. 3A-3B, a first front arm 110g1 can be fixed to and extend at an inward angle away from the first main rotor drive shaft bearing 108a towards a front end of the frame 110, and a second front arm 110g2 can be fixed to and extend at an inward angle away from the second main rotor drive shaft bearing 108b towards the front end of the frame 110, such that distal ends of the first front arm 110g1 and the second front arm 110g2 are both fixed to and support a first output pivot shaft trunnion bearing 117a directly above a second output pivot shaft trunnion bearing 117b. The second output pivot shaft trunnion bearing 117b can be fixed to a center of a front pedestal 110h, wherein the front pedestal 110h can be connected to both a front end of the first elongated foot 110a and to a front end of the second elongated foot 110b. The first output pivot shaft trunnion bearing 117a and the second output pivot shaft trunnion bearing 117b can include central holes formed therethrough which are in axial alignment with each other.

Referring back to FIG. 2A, the input impulse magnet assembly 102 can be pivotally disposed between the upper input impulse magnet assembly bearing 102a and the lower input impulse magnet assembly bearing 102b. The input impulse magnet assembly 102 preferably includes both a north pole end N and a south pole end S, as illustrated in FIGS. 7A-8B.

An input impulse magnet assembly shaft 102c can extend through a center of the input impulse magnet assembly 102 (perpendicular to the N-S pole axis) such that a first end of the input impulse magnet assembly shaft 102c extends through the central hole in the upper input impulse magnet assembly bearing 102a and a second end of the input impulse magnet assembly shaft 102c extends through the central hole of the lower input impulse magnet assembly bearing 102b to secure the input impulse magnet assembly 102 in place between the upper input impulse magnet assembly bearing 102a and the lower input impulse magnet assembly bearing 102b. Alternatively, the shaft 102c can be provided as two separate sections, where a first section of the input impulse magnet assembly shaft 102c can be fixed at a top portion of the input impulse magnet assembly 102 and extends through the center hole in the upper input impulse magnet assembly bearing 102a, and a second section of the input impulse magnet assembly shaft 102c can be fixed to a bottom portion of the input impulse magnet assembly 102, at a position opposite to and in alignment with the first section of the input impulse magnet assembly shaft 102c, and extends through the center hole in the lower input impulse magnet assembly bearing 102b. The input impulse magnet assembly shaft 102c preferably extends through the upper input impulse magnet assembly bearing 102a to a length such that an input lever bracket 114 can be fixedly secured thereto. The input lever bracket 114 can be connected to a first end of an input lever 118 such that the input lever 118 extends horizontally away from the input lever bracket 114. The input lever 118 can be pivoted back and forth by pivoting a second end thereof to cause the input impulse magnet assembly shaft 102c and the input impulse magnet assembly 102 to pivot back and forth about the upper input impulse magnet assembly bearing 102a and the lower input impulse magnet assembly bearing 102b. More specifically, when the input lever 118 is pivoted back and forth the shaft 102c will also pivot back and forth about the upper input impulse magnet assembly bearing 102a and the lower input impulse magnet assembly bearing 102b since the input lever bracket 114 is securely fixed to the input lever 118. This in turn will cause the input impulse magnet assembly 102 to pivot in unison with the pivoting of the input lever 118.

Referring to FIGS. 2A-2B and 3B, the rotary reactor magnet assembly 104 can be rotatably disposed between the first main rotor drive shaft bearing 108a and the second main rotor drive shaft bearing 108b. More specifically, a main rotor shaft 108 can extend axially through a center of the first main rotor drive shaft bearing 108a, through the rotary reactor magnet assembly 104 and through the second main rotor drive shaft bearing 108b to retain the rotary reactor magnet assembly 104 and the main rotor shaft 108 in a fully rotatable manner between the first main rotor drive shaft bearing 108a and the second main rotor drive shaft bearing 108b. The main rotor shaft 108 is preferably fixed within the rotary reactor magnet assembly 104 such that rotation of the rotary reactor magnet assembly 104 will rotate the main motor shaft 108 therewith. The main rotor shaft 108 preferably extends through the second main rotor drive shaft bearing 108b and further extends through a center of a flywheel 122 and is fixed to the center of the flywheel 122 such that rotation of the main rotor shaft 108 will cause the same rotation of the flywheel 122. The flywheel 122 is preferably disposed adjacent to the second main rotor drive shaft bearing 108b (see FIG. 2A).

A flywheel crank support 112 can be disposed adjacent to the second foot 110b of the frame 100 and can be provided with a third main rotor drive shaft bearing 108c fixed at an upper end thereof. The third main rotor drive shaft bearing 108c can include a central hole extending therethrough to receive the main rotor shaft 108 therethrough at an opposite side of the flywheel 122 from the side in which the second main rotor drive shaft bearing 108b is disposed. The third main rotor drive shaft bearing 108c is preferably disposed adjacent to the flywheel 122 and the third main rotor drive shaft bearing's 108c central hole is axially aligned with the end of the main rotor drive shaft 108 extending from the flywheel 122. The flywheel crank support 112 and the third main rotor drive shaft bearing 108c combination are configured to support the flywheel 122 in a rotating manner.

Referring to FIG. 2B, a flywheel crank 126 can include a first end fixed to the end of the main rotor shaft 108 and be disposed adjacent to the third main rotor drive shaft bearing 108c. Attached at a second end of the flywheel crank 126 can be a flywheel crank bearing 126a configured to rotate freely about the second end of the flywheel crank 126 by having a center rotatably fixed to the second end of the flywheel crank 126. A flywheel crank drive link 128 can include a first end fixed at a point along an outer circumference of the flywheel crank bearing 126a such that as the main rotor shaft 108 and flywheel crank 126 rotate together the flywheel crank bearing 126a moves in a circular motion together with the second end of the flywheel crank 126. A second end of the flywheel crank drive link 128 can be attached at a point along an outer circumference of an output pivot shaft bearing 115 such that the output pivot shaft bearing 115 moves back and forth via movement of the flywheel crank drive link 128 as the flywheel crank 126 rotates the flywheel crank bearing 126a in a circular motion. It is to be noted that alternative equivalent configurations can be provided to cause the output pivot shaft bearing 115 to move back and forth when the main rotor shaft 108 is rotated, without departing from the spirit and scope of the overall present inventive concept.

Referring to FIGS. 2A-2B, FIG. 4 and FIG. 5, the oscillating reactor magnet assembly 106 can be disposed between the first oscillating reactor drive shaft bearing 106a and the second oscillating reactor drive shaft bearing 106b. The oscillating reactor magnet assembly 106 can include an oscillating reactor magnet shaft 107 extending through a center thereof such that a first end of the oscillating reactor magnet shaft 107 can be inserted through a hole extending through a center of the first oscillating reactor drive shaft bearing 106a and a second opposing end of the oscillating reactor magnet shaft 107 can be inserted through a hole extending through a center of the second oscillating reactor drive shaft bearing 106b. The oscillating reactor magnet shaft 107 is preferably fixedly secured to the oscillating reactor magnet assembly 106 such that when the oscillating reactor magnet assembly 106 rotates the oscillating reactor magnet shaft 107 also rotates about the first oscillating reactor drive shaft bearing 106a and the second oscillating reactor drive shaft bearing 106b.

Figure 4:
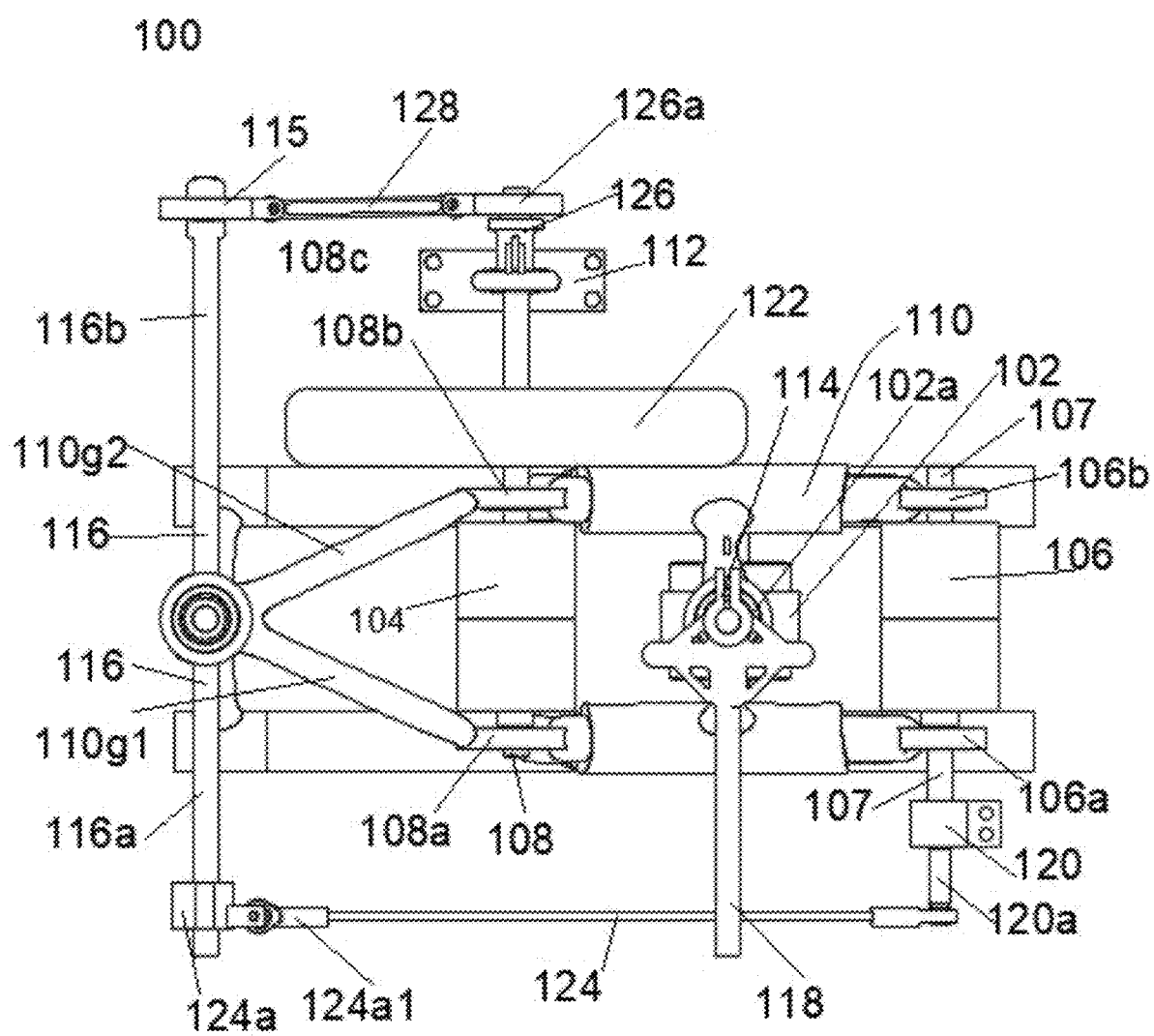
FIG. 4 illustrates a top view of the mechanical system in accordance with the example embodiment of FIGS. 2A-2B.
Figure 5:
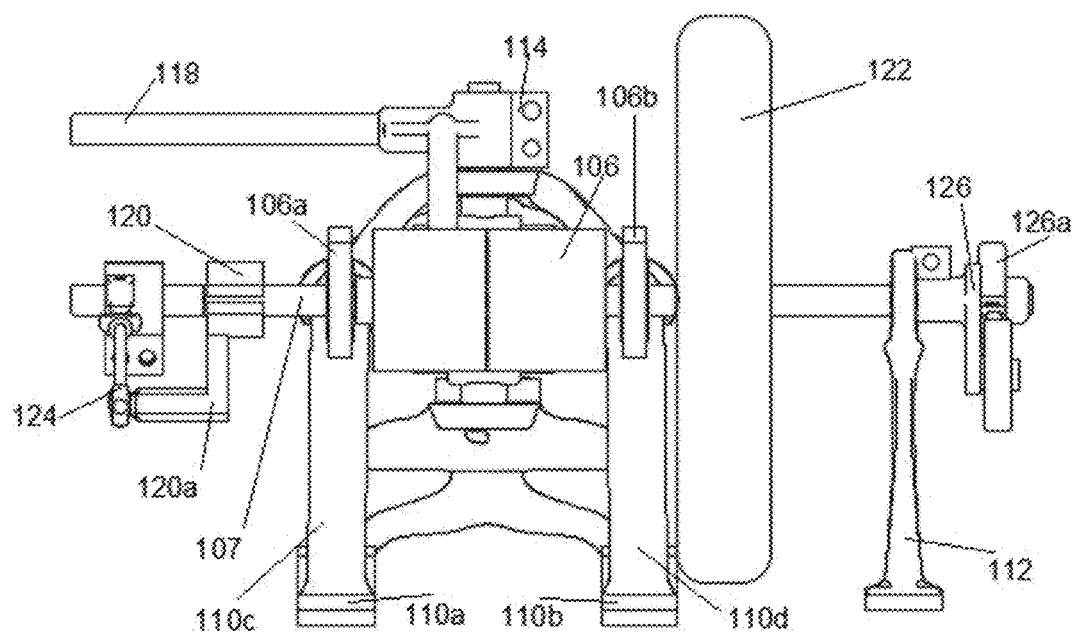
FIG. 5 illustrates a rear view of the mechanical system in accordance with the example embodiment of FIGS. 2A-2B.
Figure 6:
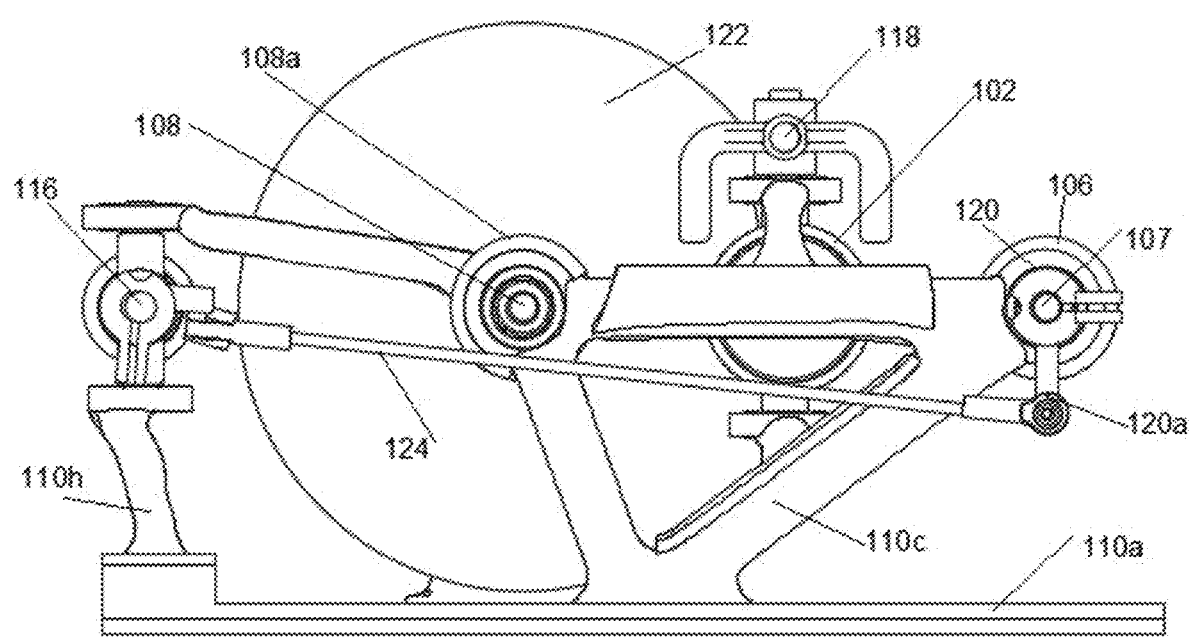
FIG. 6 illustrates a left side view of the mechanical system in accordance with the example embodiment of FIGS. 2A-2B.

Referring to FIG. 2A, the first end of the oscillating reactor magnet shaft 107 preferably extends past the first oscillating reactor drive shaft bearing 106a to fixedly receive an oscillating reactor magnet crank 120 thereon. The oscillating reactor magnet crank 120 should be fixed to the end of the oscillating reactor magnet shaft 107 such that when the oscillating reactor magnet assembly 106 and the oscillating reactor magnet shaft 107 rotate the oscillating reactor magnet crank 120 rotates therewith. The oscillating reactor magnet crank 120 can include an extension 120a to receive a first end of an oscillating reactor magnet power rod 124, as illustrated in FIG. 2A, FIG. 4 and FIG. 5. The first end of the oscillating reactor magnet power rod 124 is preferably rotatably fixed onto an end of the oscillating reactor magnet crank extension 120a such that when the oscillating reactor magnet crank 120 oscillates or pivots back and forth as a result of the movement of the oscillating reactor magnet assembly 106 and the oscillating reactor magnet shaft 107 the oscillating reactor magnet power rod 124 will shift forward and backward, as described in more detail below.

Referring to FIGS. 2A-2B and FIGS. 4-6, an output pivot shaft trunnion 117 can be disposed between the first output pivot shaft trunnion bearing 117a and the second output pivot shaft trunnion bearing 117b. The output pivot shaft trunnion 117 can have a cylindrical shape but is not limited thereto. The cylindrical output pivot shaft trunnion 117 can include a first extension member 117c extending from one side thereof a second extension member 117d (not illustrated) extending from a second side thereof such that the first and second extension members 117c and 117d are axially aligned with each other and extend perpendicular to the cylindrical shape of the output pivot shaft trunnion 117. A distal end of the first extension member 117c can be received through a center of the first output pivot shaft trunnion bearing 117a and a distal end of the second extension member 117d can be received through the center of the second output pivot shaft trunnion bearing 117b such that the output pivot shaft trunnion 117 is free to rotate 360 degrees between and about the first output pivot shaft trunnion bearing 117a and the second output pivot shaft trunnion bearing 117b. The output pivot shaft trunnion 117 is preferably fixed between the first output pivot shaft trunnion bearing 117a and the second output pivot shaft trunnion bearing 117b such that while the output pivot shaft trunnion 117 rotates about the first output pivot shaft trunnion bearing 117a and the second output pivot shaft trunnion bearing 117b the output pivot shaft trunnion 117 does not move upward or downward with respect to the first output pivot shaft trunnion bearing 117a and the second output pivot shaft trunnion bearing 117b.

An output pivot shaft 116 can be configured to extend through a center portion of the output pivot shaft trunnion 117 such that a first end of the output pivot shaft 116a extends outward from a first end of the output pivot shaft trunnion 117 and a second end of the output pivot shaft 116b extends outward from a second end of the output pivot shaft trunnion 117 and is axially aligned with the cylindrical shape of the output pivot shaft trunnion 117. Thus, the output pivot shaft 116 extends perpendicular to the first extension member 117c and the second extension member 117d of the output pivot shaft trunnion 117, as illustrated in FIGS. 2A and 2B.

Referring to FIGS. 2A-2B, FIG. 4 and FIG. 6, a second end of the oscillating reactor magnet power rod 124 can be connected to the first end 116a of the output pivot shaft 116. For example, the oscillating reactor magnet power rod 124 can be connected to the first end 116a of the output pivot shaft 116 with a power rod clamp 124a. The power rod clamp 124a can include a swivel section 124a1 that can swivel with respect to the main body portion of the clamp 124a. The swivel portion 124a1 can be fixed at one end thereof to the second end of the oscillating reactor magnet power rod 124 while the main body of the clamp 124a can be fixed to the end of the first end 116a of the output pivot shaft 116 such that when the oscillating reactor magnet power rod 124 is moved back and forth by the rocking/oscillating motion of the oscillating reactor magnet crank extension 120a, the output pivot shaft 116 will rotate back and forth as the output pivot shaft trunnion 117 rotates back and forth about the first output pivot shaft trunnion bearing 117a and the second output pivot shaft trunnion bearing 117b.

In addition to the power being transferred to the output pivot shaft 116 from the oscillating reactor magnet assembly 106, the oscillating reactor magnet shaft 107, the oscillating reactor magnet crank 120 and the oscillating reactor magnet power rod 124, the output pivot shaft 116 also receives power from the rotary reactor magnet assembly 104. More specifically, the second end of the output pivot shaft 116*b* can be inserted through a center hole of the output pivot shaft bearing 115. Accordingly, when the rotary reactor magnet assembly 104 rotates as a result of the magnetic forces applied by the input impulse magnet assembly 102 the main rotor drive shaft 108 is rotated therewith, which in turn rotates the flywheel crank 126, which in turn moves the flywheel crank bearing 126*a* about the flywheel crank 126, which moves the flywheel crank drive link 128 back and forth. As the flywheel crank drive link 128 moves back and forth the output pivot shaft bearing 115 also moves back and forth, which causes the output pivot shaft 116 to rotate back and forth while also causing the output pivot shaft trunnion 117 to rotate back and forth about the first output pivot shaft trunnion bearing 117*a* and the second output pivot shaft trunnion bearing 117*b*.

Figure 7A:
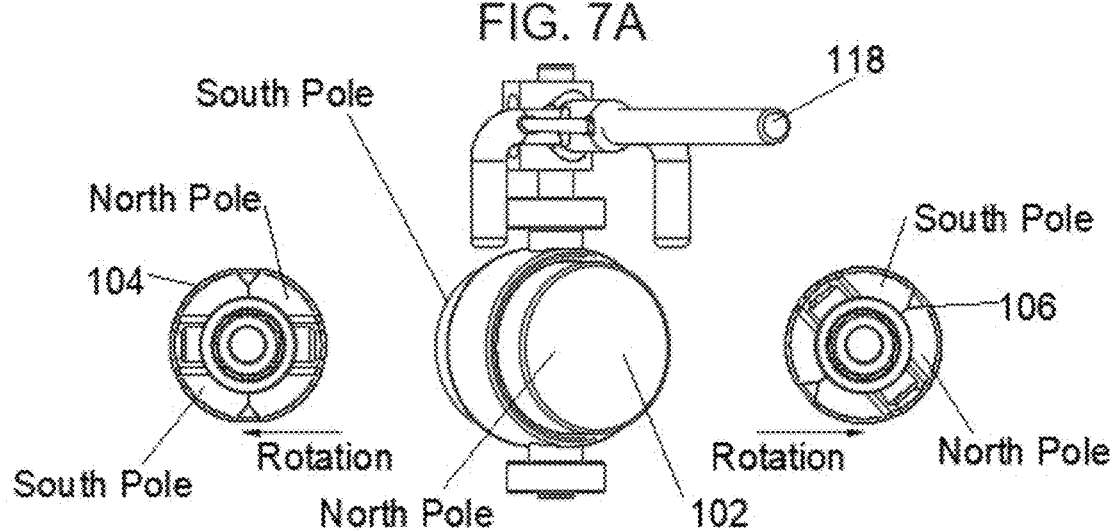
FIG. 7A illustrates a left side view of a first operational movement of the mechanical system in accordance with the example embodiment of FIGS. 2A-2B.
Figure 7B:
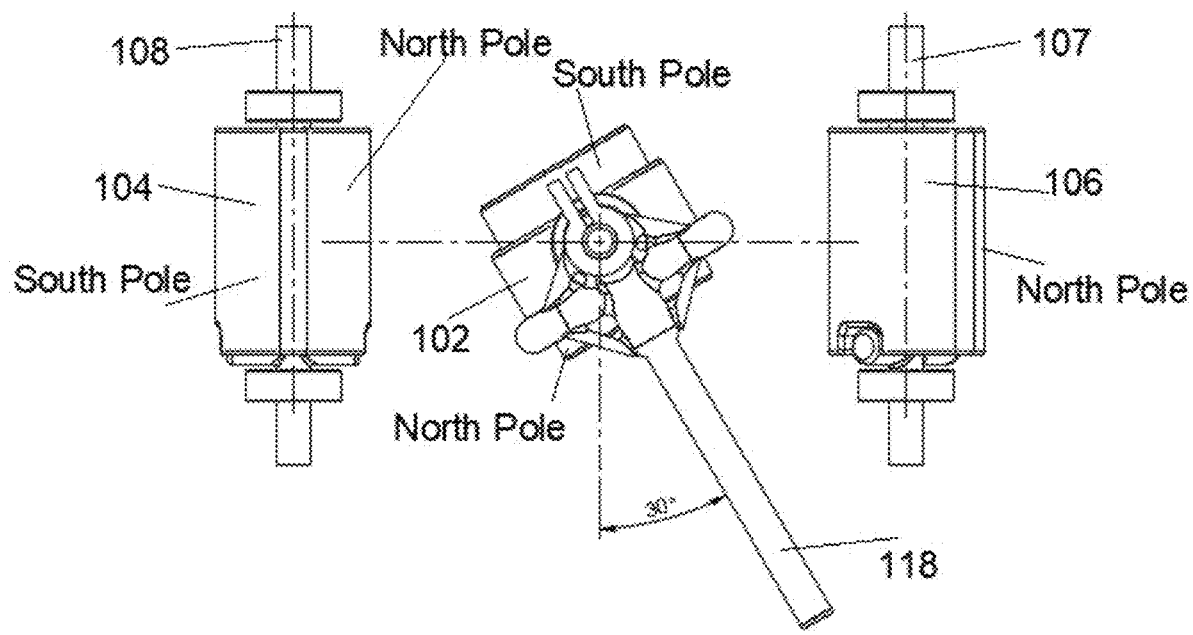
FIG. 7B illustrates a top view of the first operational movement of the mechanical system in accordance with FIG. 7A.
Figure 8A:
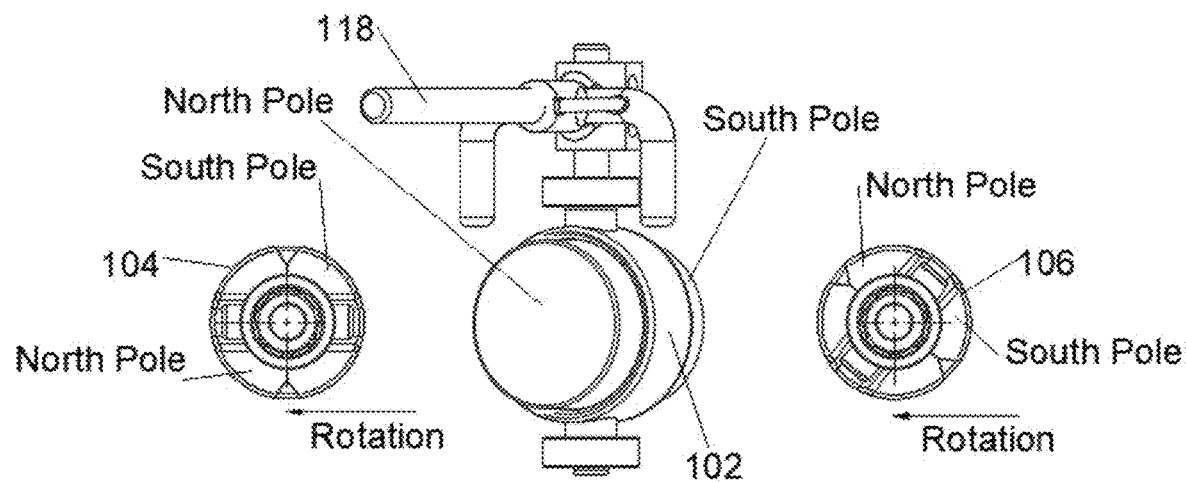
FIG. 8A illustrates a left side view of further operational movement of the mechanical system in accordance with the example embodiment of FIGS. 2A-2B.
Figure 8B:
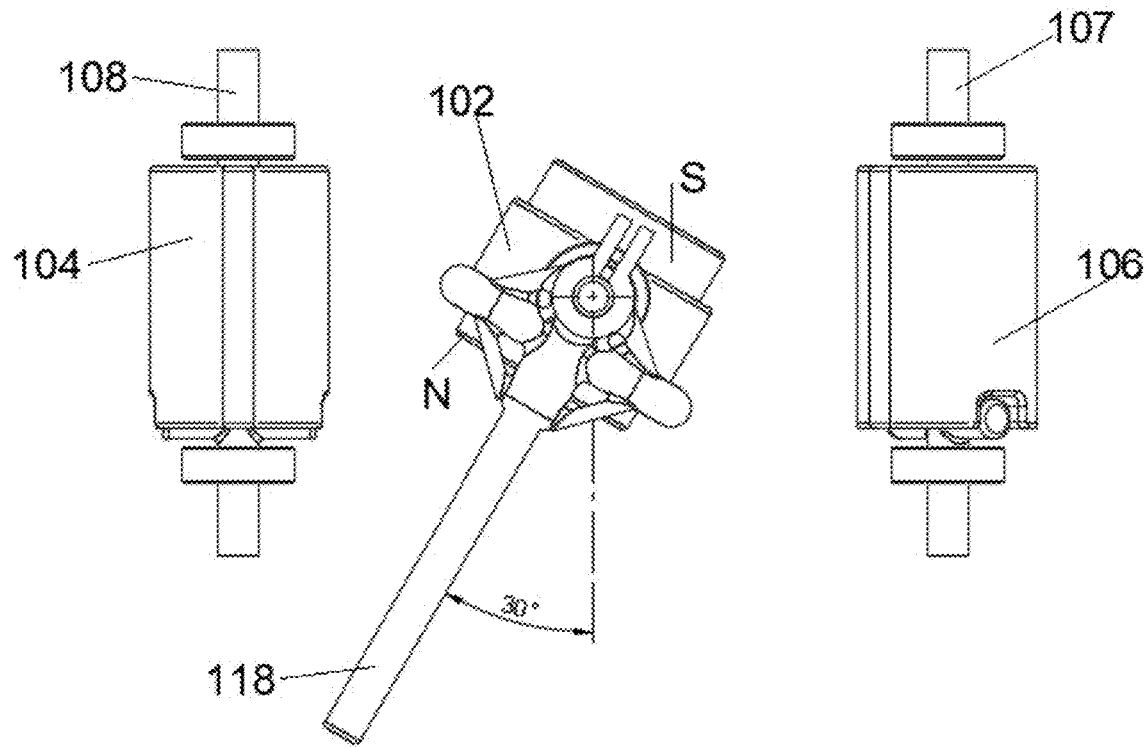
FIG. 8B illustrates a top view of the further operational movement of the mechanical system in accordance with FIG. 8A.

The input impulse magnet assembly 102 can include a north pole magnetic field N at one end thereof and a south pole magnetic field S at a second opposite end thereof, as illustrated in FIGS. 7B and 8B. The rotary reactor magnet assembly 104 can by cylindrical in shape and include a north pole magnetic field N extending along a side of the cylindrical length thereof and a south pole magnetic field S extending along another side of the cylindrical length thereof at substantially 180 degrees from the position of the north pole magnetic field N. The oscillating reactor magnet assembly 106 can by cylindrical in shape and include a north pole magnetic field N extending along a side of the cylindrical length thereof and a south pole magnetic field S extending along another side of the cylindrical length thereof at substantially 180 degrees from the north pole magnetic field N. However, the input impulse magnet assembly 102, the rotary reactor magnet assembly 104 and the oscillating reactor magnet assembly 106 can alternatively be provided in any equivalent shape which will provide the intended purposes as described below.

Operations of the Mechanical System

Figure 9A:
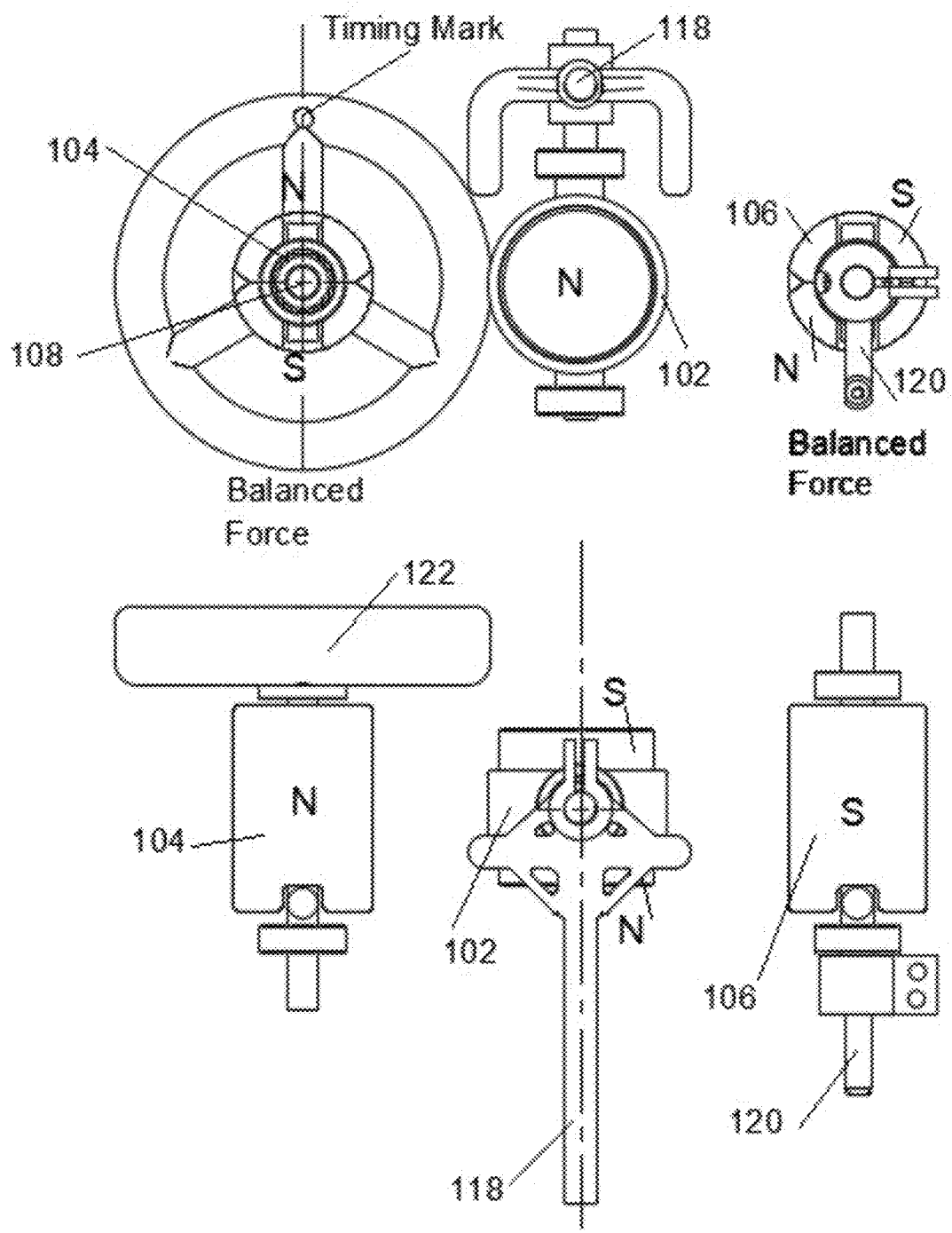
FIG. 9A illustrates a first phase of operational movement of the mechanical system in accordance with the example embodiment of FIGS. 2A-2B.

FIG. 9A illustrates both a side view (upper drawing) and a top view (lower drawing) of a first phase of the mechanical system 100 to amplify work output to be greater than work input, according to an example embodiment of the present inventive concept. Referring to FIG. 9A, prior to operation of the mechanical system 100, the input impulse magnet assembly 102 is centered as illustrated. Neither the north pole N nor the south pole S of the input impulse magnet assembly 102 are facing the rotary reactor magnet assembly 104 or the oscillating reactor magnet assembly 106. At this stage the flywheel 122 timing is at "0" degrees, creating an even spaced, and balanced North/South polarity relationship of the rotary reactor magnet assembly 104 and the oscillating reactor magnet assembly 106. At this position of the flywheel 122 the force required to move the input lever 118 is nullified and balanced.

Figure 9B:
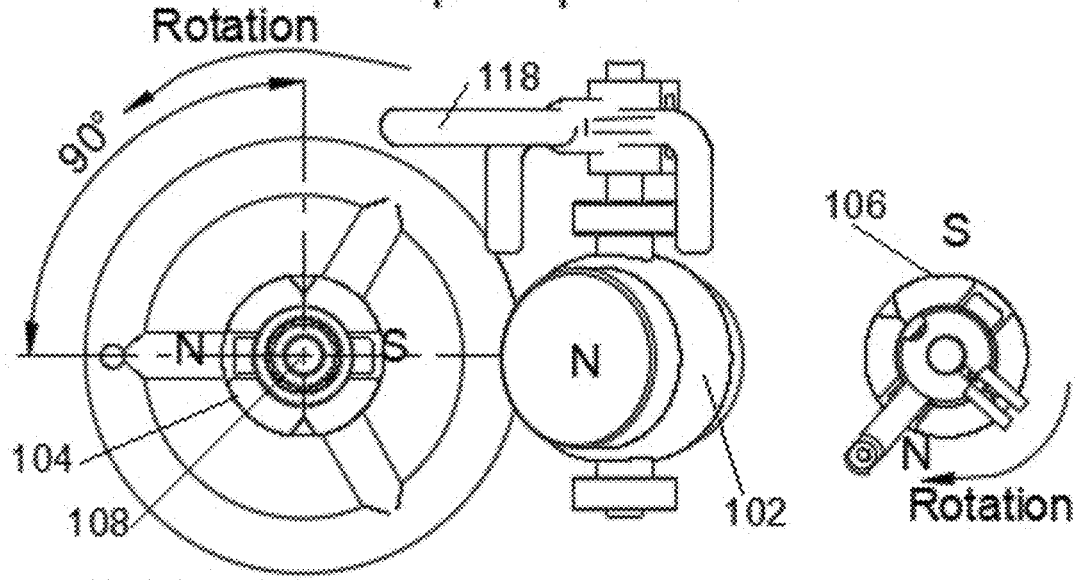
FIG. 9B illustrates a second phase of operational movement of the mechanical system in accordance with the example embodiment of FIGS. 2A-2B.
Figure 9B:
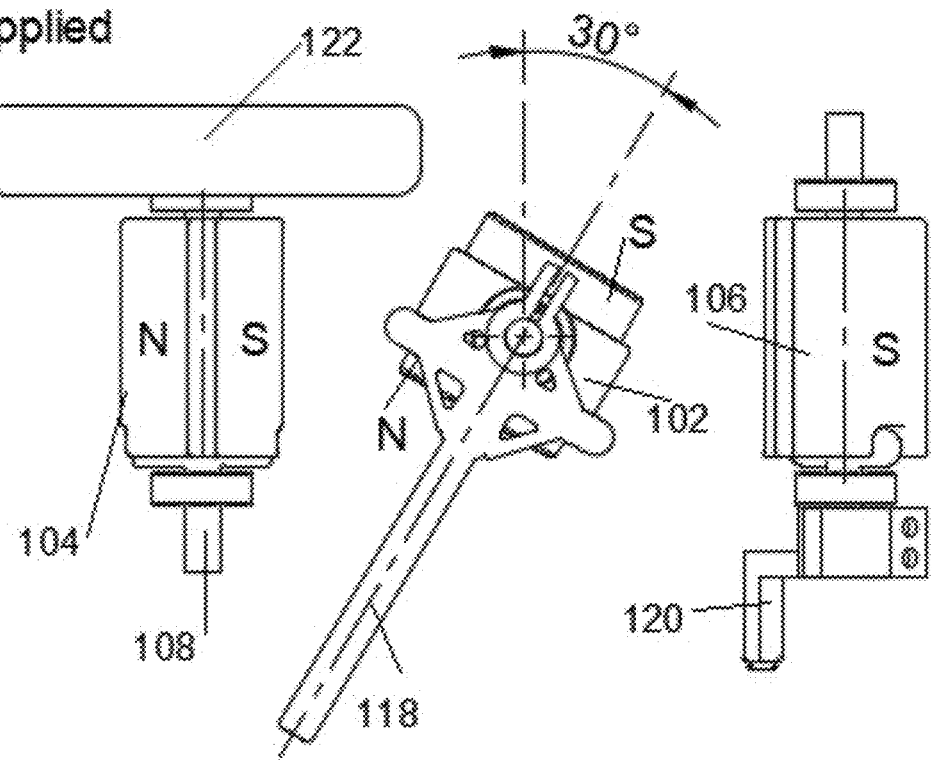

FIG. 9B illustrates both a side view (upper drawing) and a top view (lower drawing) of a second phase of the mechanical system 100, according to an example embodiment of the present inventive concept. Referring to FIG. 9B, the input impulse magnet assembly 102 is shifted to alter the angular position and polarity relationship relative to the rotary reactor magnet assembly 104 and the oscillating reactor magnet assembly 106. The input impulse magnet assembly 102 can be shifted by pivoting the input lever 118 extending therefrom. This shifting of the input impulse magnet assembly 102 allows the North and South poles thereof to attract and repel, creating an unbalanced condition resulting in a rotary force being applied to both the rotary reactor magnet assembly 104 and the oscillating reactor magnet assembly 106. The design and positioning of the input impulse magnet assembly 102, the 104 and the oscillating reactor magnet assembly 106 is configured such that a peak force will be applied at the flywheel 122 position of 90 degrees from the neutral position illustrated in FIG. 9A. The rotary reactor magnet assembly 104 drives the flywheel 122 via the commonly connected main rotor drive shaft 108. The oscillating reactor magnet assembly 106 converts rotary force into linear force via the oscillating reactor magnet crank 120 and its extension 120*a* and the associated oscillating reactor magnet power rod 124.

FIG. 9C illustrates both a side view (upper drawing) and a top view (lower drawing) of a third phase of the mechanical system 100, according to an example embodiment of the present inventive concept. Referring to FIG. 9C, rotational energy stored in the flywheel 122 during the second phase carries the rotating assembly through the neutral flywheel position of 180 degrees. In this position forces are once again balanced as in the first phase illustrated in FIG. 9A, allowing the input impulse magnet assembly 102 to be easily recentered and further shifted to the opposite "extreme" position with little force. The input impulse magnet assembly 102 is preferably moved, via the input lever 118, from its neutral position (FIG. 9A) to a position approximately 30 degrees from the neutral position (FIG. 9B), and then moved back to the neutral position (FIG. 9A) and toward the extreme opposite (with respect to the position illustrated in FIG. 9A) position approximately 30 degrees from the neutral position, as illustrated in FIG. 9D.

Figure 9D:
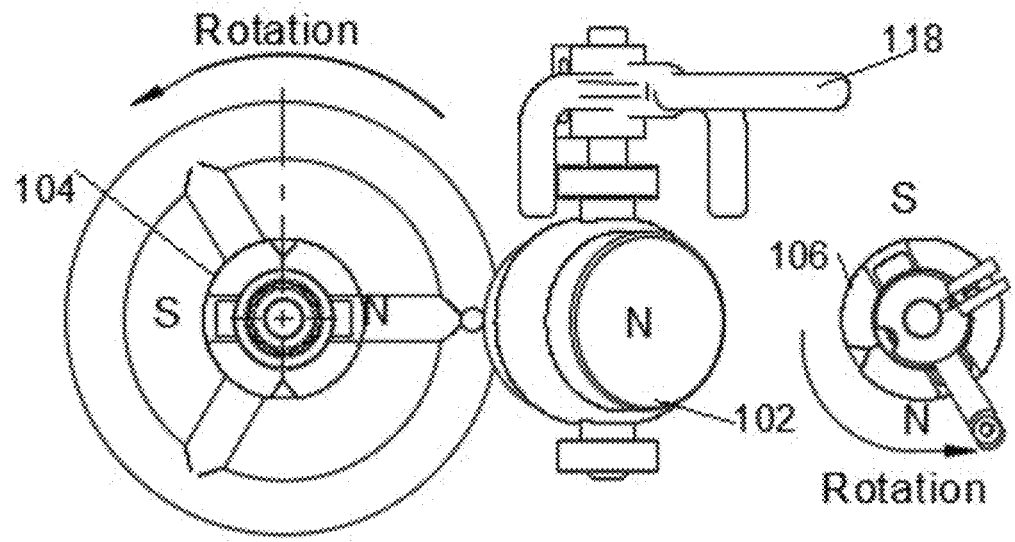
FIG. 9D illustrates a fourth phase of operational movement of the mechanical system in accordance with the example embodiment of FIGS. 2A-2B.
Figure 9D:
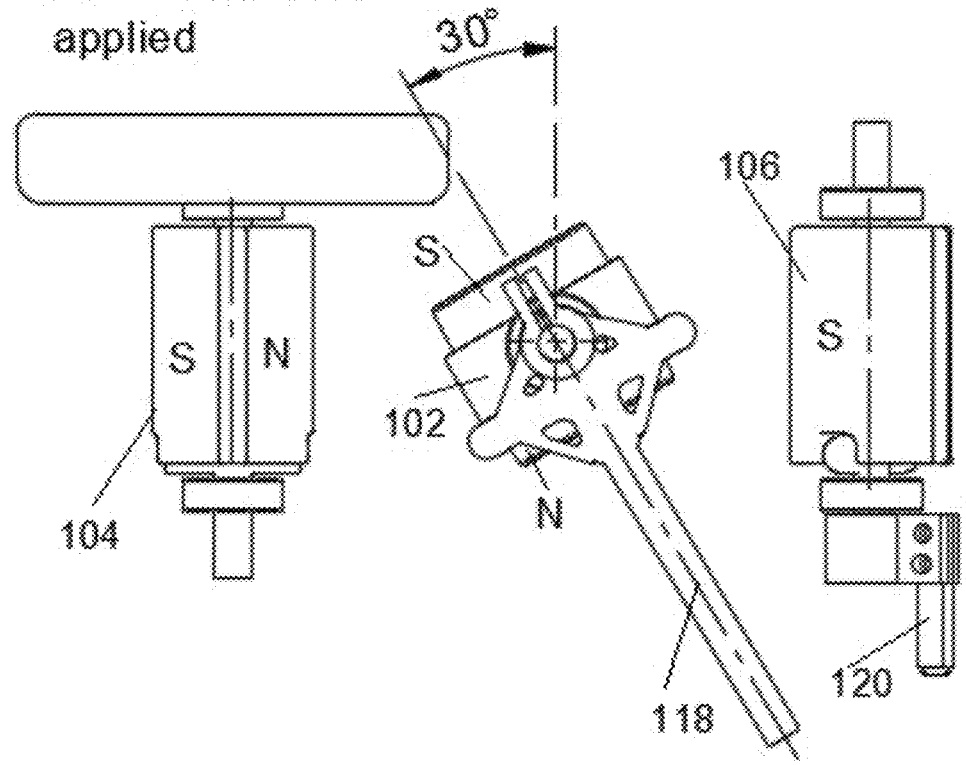

FIG. 9D illustrates both a side view (upper drawing) and a top view (lower drawing) of a fourth phase of the mechanical system 100, according to an example embodiment of the present inventive concept. Referring to FIG. 9D, the input impulse magnet assembly 102 at this phase is now positioned opposite that of the second phase (see FIG. 9B), creating the same polarity interactions of the rotary reactor magnet assembly 104 and the oscillating reactor magnet assembly 106, as in the second phase, resulting in another rotational event with peak force applied at 270 degrees of flywheel 122 position, again storing inertial energy which carries the rotating assembly back to a flywheel 122 position of 0 degrees as in the first phase.

The phase descriptions and associated timed component positions described above depict the cyclic aspects of motion within the system for 360 degrees of flywheel (112) rotation, or one complete linear cycle of the Output Pivot Shaft (116). These phases and associated timed component positions are the two areas where work can be extracted from the system. Rotational torque can be delivered via the main rotor drive shaft 108 and, or linear work may be delivered via the output pivot shaft 116 depending on the application. Sequential transitioning of the input lever 118 and the associated input impulse magnet assembly 102 from any one phase to the next initiates motion within the system. This motion can be broken into periodic, 180 degrees of rotation, start and stop sequences by transitioning the input lever 118 from either of the positions depicted in FIG. 9B and FIG. 9D to the opposing position or operated in a continuous manor by repeatedly shifting the input lever (118) between these two positions. This transition takes place at the rotational input impulse neutral position depicted in FIG. 9A and FIG. 9C.

Efficiency of System

For the purpose of this comparison, output forces can be measured at a point on the output pivot shaft 116, equal in length from the pivot point to the measurement point on the input lever 118. Since both the output pivot shaft 116 and the output lever 118 move in an equal linear, cyclic motion, the acquired data directly correlates. When operating the system from a standstill at Phase 1 depicted in FIG. 9A, starting at the Phase 2 position depicted in FIG. 9B, and ending at the Phase 4 position depicted in FIG. 9D, the linear force required to move the input lever 118 through the extent of its travel is 8 oz. This results in 5 lbs. of linear force being delivered, over an equal length of travel, to the output pivot shaft 116 when measured at an equal distance from the pivot points of the output pivot shaft 116 and the output lever 118, resulting in an operational efficiency of 10:1, which is a force amplification of 10×. The system 100 is also capable of reversing that sequence from Phase 4 to Phase 2 by shifting the input lever 118 to the opposite extreme resulting in the same force amplification in the opposite direction.

In applications requiring continuous operation, such as, for example a motor, the input lever 118 is shifted continuously at the null points of rotation depicted in FIG. 9A and FIG. 9C, Phases 1 and 3. The revolutions per minute (RPM) is proportional to the input lever's 118 complete cycles per minute, as the output motion emulates the input frequency. As the RPM increases, the kinetic energy stored in the flywheel 122 increases disproportionally to the amount of energy extracted to carry the system through the null periods. In the embodied design as illustrated in FIGS. 2A and 2B, at 1000 RPM, the maximum measured, sustained cyclic load was 38 lbs. while the force required to shift the input lever 118 remained at 8 oz. through the extent of its travel, resulting in an input to output efficiency of 76:1.

Figure 10:
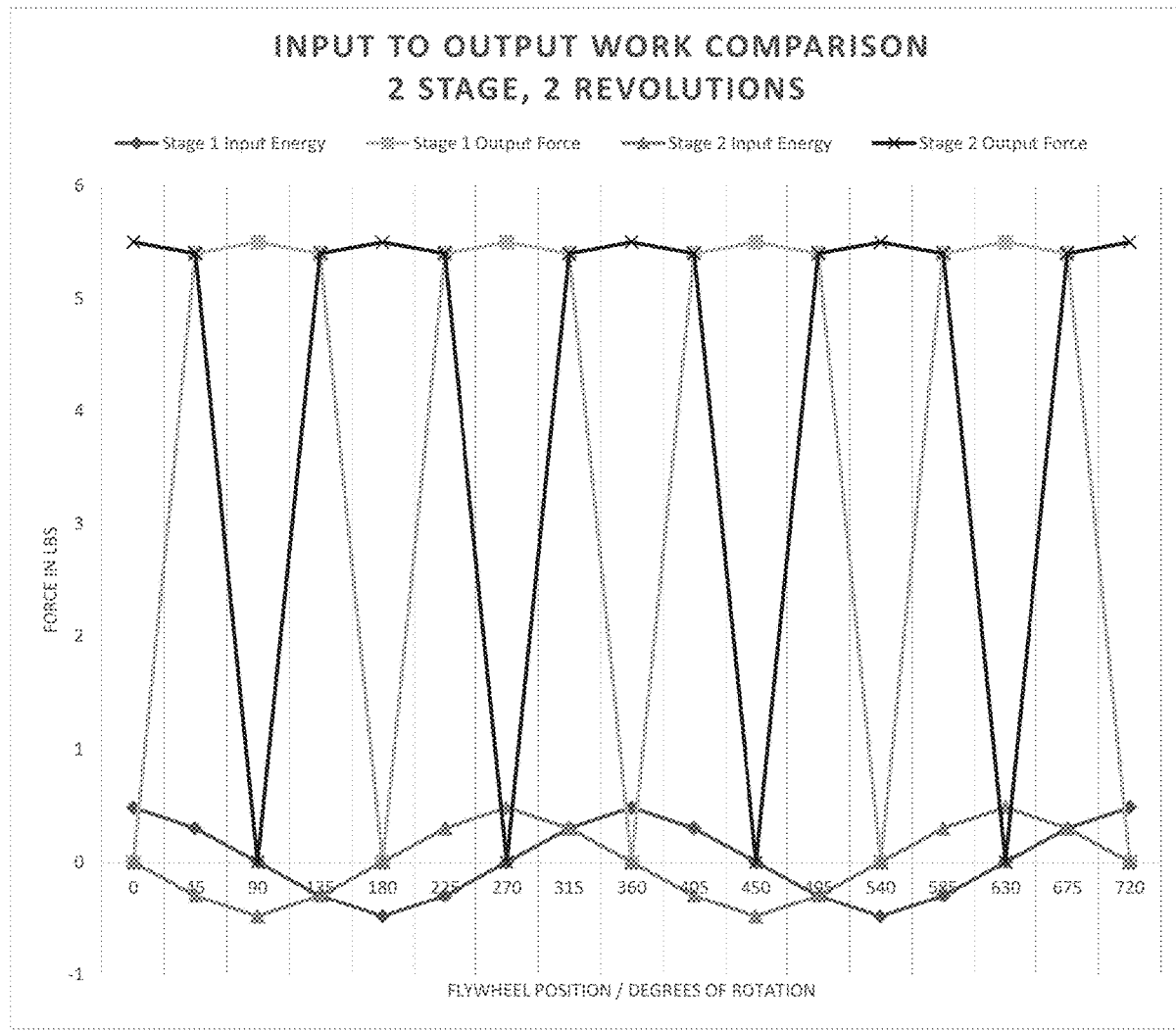
FIG. 10 illustrates a comparison between the input energy to output energy ratio of the over only two revolutions of the mechanical system in accordance with an example embodiment of FIGS. 2A and 2B.

FIG. 10 illustrates a comparison between the input energy to output energy ratio over only two revolutions. While the input energy remains minimal the output energy over multiple revolutions will continue to increase.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A mechanical energy amplification system, comprising:
   a framework including:
     a front portion having an output pivot shaft trunnion rotatably disposed thereon, the output pivot shaft trunnion including an output pivot shaft extending therethrough and having a first end and a second end,
     a middle portion having a cylindrical rotary reactor magnet assembly rotatably disposed thereon, the cylindrical rotary reactor magnet assembly including a main motor shaft extending through an axial center portion thereof to rotate together with the cylindrical rotary reactor magnet assembly,
     a rear portion having a cylindrical oscillating reactor magnet assembly rotatably disposed thereon, the cylindrical oscillating reactor magnet assembly including an oscillating reactor magnet shaft extending through an axial center portion thereof to rotate with the cylindrical oscillating reactor magnet assembly and an oscillating reactor magnet crank having a first end connected to a first end of the oscillating reactor magnet shaft; and
     an input impulse magnet assembly pivotal about a vertical input impulse magnet assembly shaft extending therethrough and disposed between the cylindrical rotary reactor magnet assembly and the oscillating reactor magnet assembly and including a magnetic north pole disposed at a first end, a magnetic south pole disposed at a second opposite end and an input lever extending therefrom to pivot the input impulse magnet assembly back and forth to pivot the magnetic north pole and the magnetic south pole towards and away from the cylindrical rotary reactor magnet assembly and the cylindrical oscillating reactor magnet assembly;
   a flywheel disposed adjacent to a first end of the cylindrical rotary reactor magnet assembly and receiving a first end of the main motor shaft through a center thereof to rotate therewith;
   a flywheel crank having a first end attached to the first end of the main motor shaft to rotate therewith together with the flywheel and including a flywheel crank bearing rotatably connected to a second end of the flywheel crank;
   an oscillating reactor magnet power rod rotatably connected at a first end thereof to a second end of the oscillating reactor magnet crank and configured to shift back and forth when the oscillating reactor magnet crank rotates and at a second end thereof rotatably connected to a first end of the output pivot shaft to pivot the output pivot shaft and the output pivot shaft trunnion when the oscillating reactor magnet crank rotates; and
   a flywheel crank drive link having a first end connected to the flywheel crank bearing and a second end rotatably connected to the second end of the output pivot shaft and configured to shift back and forth when the flywheel crank bearing rotates about the second end of the flywheel crank to pivot the output pivot shaft and the output pivot trunnion.

2. The mechanical energy amplification system according to claim 1, wherein:
   the cylindrical rotary reactor magnet assembly includes an elongated magnetic north pole extending along a length thereof and an elongated magnetic south pole extending along the length thereof and disposed at 180 degrees from the elongated magnetic north pole, and
   the cylindrical oscillating reactor magnet assembly includes an elongated magnetic north pole extending along a length thereof and an elongated magnetic south pole extending along the length thereof and disposed at 180 degrees from the elongated magnetic north pole.

3. The mechanical energy amplification system according to claim 2, wherein:
   the front portion includes a pair of output pivot trunnion bearings axially aligned vertically to rotatably secure the output pivot shaft trunnion in place,
   the middle portion includes a pair of main rotor drive shaft bearings axially aligned horizontally to rotatably secure the cylindrical rotary reactor magnet assembly in place,
   the rear portion includes a pair of oscillating reactor magnet assembly bearings axially aligned horizontally to rotatably secure the oscillating reactor magnet assembly in place, and
   a pair of input impulse magnet assembly bearings axially aligned vertically to rotatably secure the input impulse magnet assembly in place by being fixed to first and second ends of the vertical input impulse magnet assembly shaft.

4. The mechanical energy amplification system according to claim 3, wherein the cylindrical rotary reactor magnet assembly includes a shaft extending vertically therethrough and rotatably fixed to the pair of input impulse magnet assembly bearings, the shaft including an input lever bracket connected to one end thereof in which the input lever in connected to and extends therefrom.

5. The mechanical energy amplification system according to claim 3, wherein the framework includes:
   a pair of elongated feet extending in parallel;
   a front pedestal connected between the pair of elongated feet having a middle portion connected to a lower one of the pair of output pivot trunnion bearings;
   a first front arm connected between a first one of the pair of main rotor drive shaft bearings and an upper one of the pair of outer pivot trunnion bearings;
   a second front arm connected between a second one of the pair of main rotor drive shaft bearings and the upper one of the pair of outer pivot trunnion bearings;
   a first v-shaped member having a first leg extending from a first one of the pair of elongated feet and connected to the first one of the pair of main rotor drive shaft bearings and a second leg extending from the first one of the pair of elongated feet and connected to a first one of the pair of oscillating reactor magnet assembly bearings; and
   a second v-shaped member having a first leg extending from a second one of the pair of elongated feet and connected to the second one of the pair of main rotor drive shaft bearings and a second leg extending from the second one of the pair of elongated feet and connected to a second one of the pair of oscillating reactor magnet assembly bearings.

6. The mechanical energy amplification system according to claim 5, wherein the framework further includes:
   a first rear arm extending between the first oscillating reactor magnet assembly bearing and the first main rotor drive shaft bearing;
   a second rear arm extending between the second oscillating reactor magnet assembly bearing and the second main rotor drive shaft bearing;
   a rear upper pedestal connected between the first and second rear arms to fixedly support an upper one of the pair of input impulse magnet assembly bearings; and
   a rear lower pedestal connected between the pair of elongated feet to fixedly support a lower one of the pair of input impulse magnet assembly bearings.

7. The mechanical energy amplification system according to claim 1, wherein output energy/force is supplied by movement of the first end of the output pivot shaft.

8. The mechanical energy amplification system according to claim 6, wherein the framework is a unitary body including the pair of elongated feet, the front pedestal, the first and second front arms, the pair of output pivot trunnion bearings, the pair of main rotor drive shaft bearings, the first and second v-shaped members, the rear upper and lower pedestals and the pair of input impulse magnet assembly bearings.

9. A mechanical energy amplification system, comprising:
   a pair of elongated feet extending in parallel;
   a front pedestal connected between a front end of the pair of elongated feet and having a first output pivot shaft trunnion bearings connected thereto;
   a first v-shaped member extending from a middle portion of a first one of the pair of elongated feet and having a first rotary reactor magnet assembly bearing connected to an end of a first leg thereof and a first oscillating reactor magnet assembly bearing connected to an end of a second leg thereof;
   a second v-shaped member extending from a middle portion of a second one of the pair of elongated feet and having a second rotary reactor magnet assembly bearing connected to an end of a first leg thereof and axially aligned with the first rotary reactor magnet assembly bearing and a second oscillating reactor magnet assembly bearing connected to an end of a second leg thereof and being axially aligned with the first oscillating reactor magnet assembly bearing;
   a second output pivot shaft trunnion bearing disposed directly above and axially aligned with the first output pivot shaft trunnion bearing and fixed to both the first and second rotary reactor magnet assembly bearings;
   an output pivot shaft trunnion pivotally connected between the first and second output pivot shaft trunnion bearings and having a first output pivot shaft extending horizontally from one side thereof and a second output pivot shaft extending horizontally from an opposite side thereof such that the first and second output pivot shafts are axially aligned;
   a cylindrical rotary reactor magnet assembly rotatably connected between the first and second rotary reactor magnet assembly bearings via a rotary reactor magnet assembly shaft extending through an axial center portion thereof, the rotary reactor magnet assembly shaft having a first end rotatably connected to the first rotary reactor magnet assembly bearing and a second end extending through the second rotary reactor magnet assembly bearing and having a flywheel and a first end of a flywheel crank connected thereto, the flywheel crank having a flywheel crank bearing rotatably connected to a second end thereof;
   a cylindrical oscillating reactor magnet assembly connected between the first and second oscillating reactor magnet assembly bearings via an oscillating reactor magnet shaft extending through an axial center portion thereof, the oscillating reactor magnet shaft having an oscillating reactor magnet crank extending from one end thereof and a flywheel adjacent to the oscillating reactor magnet crank which both rotate with the oscillating reactor magnet shaft;
   an oscillating reactor magnet power rod rotatably connected at a first end thereof to the oscillating reactor magnet crank and pivotally connected at a second end to the first output pivot shaft and configured to pivot the first output pivot shaft when the oscillating reactor magnet assembly and corresponding oscillating reactor magnet shaft rotate;
   a flywheel crank drive shaft connected at a first end thereof to the flywheel crank bearing and a second end thereof connected to the second output pivot shaft and configured to pivot the second output pivot shaft when the cylindrical rotary reactor magnet assembly, the rotary reactor magnet assembly shaft and the flywheel crank are rotated; and
   an input impulse reactor magnet pivotally disposed between the cylindrical rotary reactor magnet assembly and the cylindrical oscillating reactor magnet assembly configured to rotate both the cylindrical rotary reactor magnet assembly and the cylindrical oscillating reactor magnet assembly when pivoted back and forth about an input impulse reactor magnet shaft.

10. The mechanical energy amplification system according to claim 9, further comprising:
an input lever connected to the input impulse reactor magnet shaft to receive an input pivotal energy to pivot the input impulse reactor magnet.

11. The mechanical energy amplification system according to claim 10, wherein the first output pivot shaft produces an amplified output energy when at least one of the cylindrical rotary reactor magnet assembly and the cylindrical oscillating reactor magnet assembly are rotated by pivotal movement of the input lever.

12. The mechanical energy amplification system according to claim 9, wherein the second output pivot shaft trunnion bearing is fixed to the first rotary reactor magnet assembly bearing by a first front arm and fixed to the second rotary reactor magnet assembly bearing by a second front arm.

\* \* \* \* \*